(12) United States Patent
Yoshihara et al.

(10) Patent No.: US 10,115,191 B2
(45) Date of Patent: Oct. 30, 2018

(54) INFORMATION PROCESSING APPARATUS, INFORMATION PROCESSING SYSTEM, INFORMATION PROCESSING METHOD, PROGRAM, AND RECORDING MEDIUM

(71) Applicants: Yoshiko Yoshihara, Tokyo (JP); Tomoharu Kiyuna, Tokyo (JP)

(72) Inventors: Yoshiko Yoshihara, Tokyo (JP); Tomoharu Kiyuna, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/726,674

(22) Filed: Jun. 1, 2015

(65) Prior Publication Data
US 2015/0262356 A1     Sep. 17, 2015

Related U.S. Application Data

(62) Division of application No. 13/824,139, filed as application No. PCT/JP2011/071930 on Sep. 27, 2011, now Pat. No. 9,076,198.

(30) Foreign Application Priority Data

Sep. 30, 2010   (JP) ................................ 2010-223049

(51) Int. Cl.
    *G06T 7/00*     (2017.01)
    *G06T 5/00*     (2006.01)
    (Continued)

(52) U.S. Cl.
    CPC .......... *G06T 7/0012* (2013.01); *G06K 9/0014* (2013.01); *G06T 5/002* (2013.01);
    (Continued)

(58) Field of Classification Search
    CPC combination set(s) only.
    See application file for complete search history.

(56) References Cited

U.S. PATENT DOCUMENTS

7,177,454 B2 *  2/2007  McLaren ............... G01N 1/312
                                                      345/604
7,826,652 B2    11/2010  Hunt
                        (Continued)

FOREIGN PATENT DOCUMENTS

CN        1735907 A      2/2006
CN      101689220 A      3/2010
                        (Continued)

OTHER PUBLICATIONS

Office Action, dated Dec. 12, 2013, issued by the State Intellectual Property Office of the People's Republic of China, in counterpart Application No. 201180043669.3.
(Continued)

*Primary Examiner* — Tsung-Yin Tsai
(74) *Attorney, Agent, or Firm* — Sughrue Mion, PLLC

(57) ABSTRACT

The present invention provides an information processing apparatus capable of accurately separating parenchymal cells and stromal cells from each other regardless of the staining intensity of the cells. The information processing apparatus is an information processing apparatus 100 including: an image processing unit 110 for smoothing a tissue sample image 150 obtained by staining and then imaging a biological tissue containing parenchymal cells 151 and stromal cells 152 so that luminance values of cell components of each of the parenchymal cells 151 become less than those of each of the stromal cells 152; and a mask generation unit 120 for generating, through generating a binary image by binarizing the tissue sample image 115 smoothed by the
(Continued)

image processing unit 110, a mask 125 for removing a region of the stromal cells from the tissue sample image 115.

13 Claims, 22 Drawing Sheets

(51) Int. Cl.
    *G06K 9/00*       (2006.01)
    *G06T 7/11*        (2017.01)
    *G06T 7/136*      (2017.01)
(52) U.S. Cl.
    CPC ............... *G06T 7/11* (2017.01); *G06T 7/136* (2017.01); *G06T 2207/10056* (2013.01); *G06T 2207/30024* (2013.01); *G06T 2207/30242* (2013.01)

(56) References Cited

U.S. PATENT DOCUMENTS

| | | |
|---|---|---|
| 8,483,803 B2 | 7/2013 | Partain et al. |
| 2002/0081014 A1 | 6/2002 | Ravkin |
| 2005/0123181 A1* | 6/2005 | Freund ................ G02B 21/365 382/128 |
| 2006/0002608 A1 | 1/2006 | Haddon et al. |
| 2006/0127880 A1* | 6/2006 | Harris ................ G06K 9/00127 435/4 |
| 2008/0015448 A1* | 1/2008 | Keely ................ A61B 5/0091 600/477 |
| 2008/0144898 A1* | 6/2008 | Hunt ................ G06K 9/00127 382/128 |
| 2010/0054560 A1 | 3/2010 | Yamashita et al. |
| 2010/0061618 A1* | 3/2010 | Marcelpoil ............ G01N 1/30 382/133 |
| 2010/0069742 A1 | 3/2010 | Partain et al. |
| 2010/0088264 A1 | 4/2010 | Teverovskiy et al. |
| 2010/0128954 A1* | 5/2010 | Ostrovsky-Berman ............ G06T 7/11 382/131 |
| 2010/0172562 A1* | 7/2010 | Satoh ................ G06T 7/0016 382/131 |
| 2011/0052025 A1* | 3/2011 | Highnam ............ G06T 7/0016 382/131 |
| 2011/0150309 A1* | 6/2011 | Barfett ................ G06T 7/33 382/131 |
| 2012/0083519 A1 | 4/2012 | Sahali |
| 2013/0051651 A1* | 2/2013 | Leary ................ G06T 7/0012 382/133 |
| 2013/0182936 A1* | 7/2013 | Yoshihara ............ G06T 7/0012 382/133 |

FOREIGN PATENT DOCUMENTS

| | | |
|---|---|---|
| JP | 6250977 A | 3/1987 |
| JP | 2003-139678 A | 5/2003 |
| JP | 2005-352571 A | 12/2005 |
| JP | 2006-095223 A | 4/2006 |
| JP | 2008-014680 A | 1/2008 |
| JP | 2009-210409 A | 9/2009 |
| JP | 2010-523979 A | 7/2010 |
| WO | 2008/108059 A | 9/2008 |
| WO | 2008/124138 A1 | 10/2008 |

OTHER PUBLICATIONS

Communication dated Feb. 2, 2015, issued by the Japan Patent office in corresponding Japanese Application No. 2012-536449.

* cited by examiner

INFORMATION PROCESSING APPARATUS, INFORMATION PROCESSING SYSTEM, INFORMATION PROCESSING METHOD, PROGRAM, AND RECORDING MEDIUM

This is a divisional application based upon U.S. patent application Ser. No. 13/824,139 filed Mar. 15, 2013, which is a National Stage of International Application No. PCT/JP2011/071930 filed Sep. 27, 2011, claiming priority based on Japanese Patent Application No. 2010-223049 filed Sep. 30, 2010, the contents of all of which are incorporated herein by reference in their entirety.

TECHNICAL FIELD

The present invention relates to an information processing apparatus, an information processing system, an information processing method, a program, and a recording medium.

BACKGROUND ART

As a technique for supporting a diagnosis based on a tissue sample image of a biological tissue, a method in which a diagnosis is made through staining a section of a biological tissue and then observing the state of the staining is known. It is important for the diagnosis to separate a stromal part from the tissue sample image after the staining. The patent document 1 describes a classification of stroma from a biological tissue through hematoxylin-eosin staining (HE staining). Specifically, the paragraph[0073] of the patent document 1 describes the following. "Tissue stroma is dominated by the color red. The intensity difference d, "red ratio" r=R/(R+G+B) and the red channel standard deviation σR of image objects may be used to classify stroma objects." That is, stroma is stained red with eosin, and therefore, the stroma objects are classified by the color thereof.

PRIOR ART DOCUMENT

Patent Document

Patent Document 1: JP 2010-523979 A

SUMMARY OF INVENTION

Problem to be Solved by the Invention

However, when immunohistochemical staining (hereinafter referred to as "IHC staining") is performed, nuclei of stromal cells as well as nuclei of parenchymal cells are stained blue. Thus, specifically when the staining of cell membranes is weak, stromal cells and parenchymal cells cannot be separated from each other by the image processing described in "Background Art".

Hence, the present invention is intended to provide an information processing appartus, an information processing system, an information processing method, a program, and a recording medium, capable of accurately separating stromal cells and parenchymal cells from each other regardless of the staining intensity of the cells.

Means for Solving Problem

In order to achieve the aforementioned object, the information processing apparatus according to the present invention is an information processing apparatus including: an image processing unit for smoothing a tissue sample image obtained by staining and then imaging a biological tissue containing parenchymal cells and stromal cells so that luminance values of cell components of each of the parenchymal cells become less than those of each of the stromal cells; and a mask generation unit for generating, through generating a binary image by binarizing the tissue sample image smoothed by the image processing unit, a mask for removing a region of the stromal cells from the tissue sample image, wherein a diagnosis based on the tissue sample image is supported.

The information processing system according to the present invention is an information processing system including: the information processing apparatus according to the present invention; an input terminal; and a display terminal, wherein the apparatus further includes: a superimposing unit for superimposing the mask generated by the mask generation unit on the tissue sample image; a counting unit for counting the number of the parenchymal cells with each staining intensity contained in the tissue sample image with the mask superimposed thereon, a receiving unit for receiving the tissue sample image via a network; and a sending unit for sending the number of the parenchymal cells counted by the counting unit or the display data generated by the display data generation unit via a network, and the tissue sample image received by the receiving unit is input and sent, via a network, by the input terminal, and the number of the parenchymal cells counted by the counting unit or the display data generated by the display data generation unit is received, via a network, and displayed by the display terminal.

The information processing method according to the present invention is an information processing method, wherein the information processing apparatus according to the present invention is used, and the method comprises: an image processing step of smoothing the tissue sample image by the image processing unit so that luminance values of cell components of each of the parenchymal cells become less than those of each of the stromal cells; and a mask generating step of generating, through generating a binary image by binarizing the tissue sample image smoothed in the image processing step, a mask for removing a region of the stromal cells from the tissue sample image by the mask generation unit, wherein a diagnosis based on the tissue sample image is supported.

The program according to the present invention is a program capable of executing the information processing method according to the present invention on a computer.

The recording medium according to the present invention is a computer-readable recording medium including: the program according to the present invention.

Effects of the Invention

According to the present invention, parenchymal cells and stromal cells can be accurately separated from each other regardless of the staining intensity of the cells.

DESCRIPTION OF EMBODIMENTS

Embodiments of the present invention are illustrated in detail below with reference to figures. Components described in the following embodiments, however, are mere examples, and the technical scope of the present invention is not limited only thereby. In the embodiments, the concept of cell component widely encompasses components configuring a cell such as a cell nucleus, a cell membrane, cytoplasm, and lymphocyte.

First Embodiment

Figure 1:
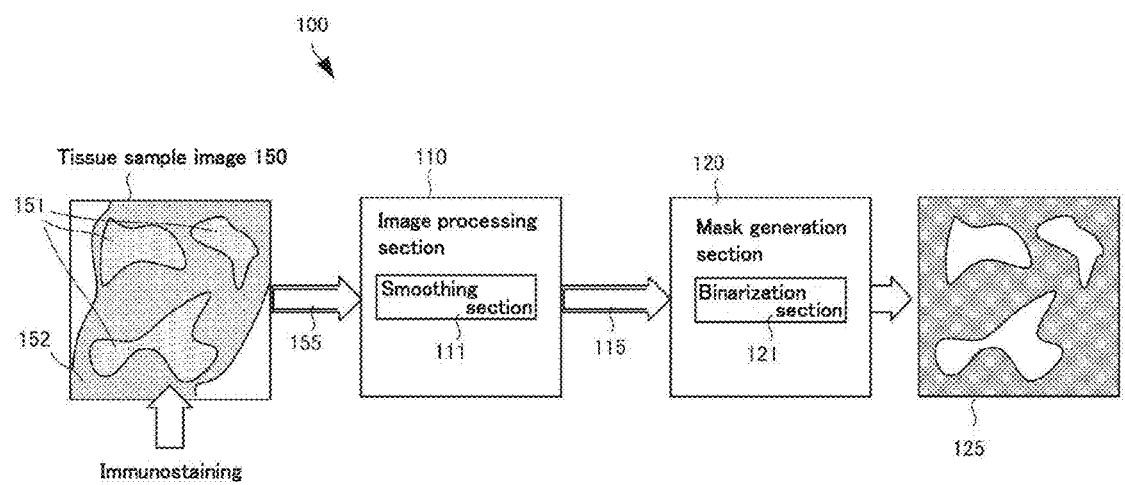
FIG. 1 is a block diagram showing a configuration of an information processing apparatus according to the first embodiment of the present invention.

An information processing apparatus 100 according to the first embodiment of the present invention is described with reference to FIG. 1. FIG. 1 shows the information processing apparatus 100 for supporting a diagnosis based on a tissue sample image 150 obtained by immunostaining and then imaging a biological tissue containing parenchymal cells 151 and stromal cells 152. This information processing apparatus 100 includes: an image processing section (image processing unit) 110 for smoothing a tissue sample image 155 in a smoothing section (smoothing unit) 111 so that luminance values of cell components of each of the parenchymal cells become less than those of each of the stromal cells. The information processing apparatus 100 further includes: a mask generation section (mask generation unit) 120 for generating, through generating, in a binarization section (binarization unit) 121, a binary image by binarizing the tissue sample image 115 smoothed in the image processing section 110, a mask 125 for removing a stromal region from the tissue sample image 115. With this configuration, a mask which accurately separates the parenchymal cells 151 and the stromal cells 152 from each other can be generated regardless of the staining intensity of the cells.

Second Embodiment

An information processing system 250 according to the second embodiment of the present invention is described with reference to FIGS. 2 to 19. The information processing system 250 according to the present embodiment is a system intended to exclude a stromal part in a tissue sample image that has been stained (e.g., immunostaining, IHC staining in the present embodiment) and count the number of cancer cells in order to select a therapy for the cancer as accurately as possible. In the present embodiment, information on staining of cell nuclei and cell membranes as examples of cell components is used for recognizing stroma, and information on staining of cell nuclei is used for counting the number of cells.

Examples of the IHC staining used in the present embodiment include three types of ER staining, PgR staining, and HER2 staining. According to the ER staining and the PgR staining among them, cell nuclei of positive cells are stained brown, and those of negative cells remain blue as they have been firstly stained with hematoxylin. Further, cell membranes are not stained in either of positive cells and negative cells.

According to the HER2 staining, cell membranes of positive cells are stained brown, and those of negative cells are not observed. Further, cell nuclei are in blue regardless of positive cells or negative cells. According to such tendency of staining, when cell nuclei are stained brown in ER staining or PgR staining or when cell membranes are stained brown in HER2 staining, stroma can be recognized relatively easily. Therefore, in the case of HER2 positive, not only information on cell nuclei, but also information on cell membranes in brown is used in the binarization. Even though cell nuclei are not stained brown in ER staining or PgR staining, or cell membranes are not stained brown in HER2 staining, a region which should be focused on other than stroma is dense with cell nuclei in blue.

In either of the ER staining, the PgR staining, and the HER2 staining, the number of cells is counted by counting the number of cell nuclei. That is, the number of nuclei=the number of cells.

It is summarized as follows.
(Step 1) A mask is generated utilizing cell nuclei in smoothing and binarizing.
When ER/PgR positive, information on brown nuclei and blue nuclei is utilized.
When ER/PgR negative, information on blue nuclei is utilized.
When HER2 positive, information on brown cell membranes and blue nuclei is utilized.
When HER2 negative, information on blue nuclei is utilized.
(Step 2) Cell nuclei are utilized to count the number of cells.
In the case of ER/PgR, the number of brown nuclei and blue nuclei is counted.
In the case of HER2, the number of blue nuclei is counted. Further, the staining intensity of each cell membrane surrounding each nucleus is determined.

<Configuration of Information Processing System According to the Second Embodiment>

Figure 2:
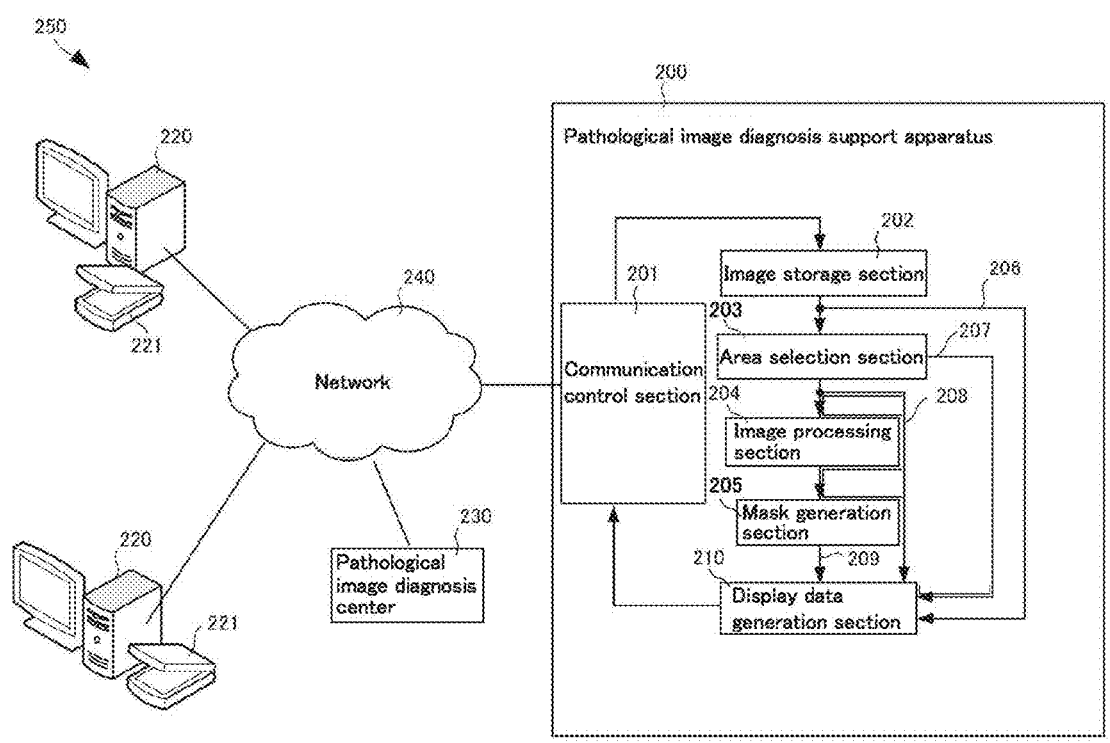
FIG. 2 is a block diagram showing a configuration of an information processing system according to the second embodiment of the present invention.

FIG. 2 is a block diagram showing a configuration of an information processing system 250 including a pathological image diagnosis support apparatus 200 as the information processing apparatus according to the second embodiment. As shown in FIG. 2, the pathological image diagnosis support apparatus 200 is connected, via a network 240, to a plurality of client PCs 220 connected to the respective color scanners 221 for reading (inputting) a tissue sample image thereinto. The pathological image diagnosis support apparatus 200 is also connected to a pathological image diagnosis center 230 for receiving an image or results obtained through processes by the pathological image diagnosis support apparatus 200 so that specialized physicians can analyze and diagnose. The pathological image diagnosis support apparatus 200 corresponds to the information processing apparatus according to the present invention. It can be said that each of the client PCs 220 and the color scanners 221 corresponds to an "input terminal" of the information processing system according to the present invention. It can be said that each of the client PCs 220 also corresponds to a "display terminal" of the information processing system according to the present invention. It can be said that the pathological image diagnosis center 230 also corresponds to a "display terminal" of the information processing system according to the present invention. The network 240 may be a public network including the Internet or an in-hospital LAN.

A communication control section 201 of the pathological image diagnosis support apparatus 200 receives a tissue sample image sent from a client PC 220 via the network 240. That is, it can be said that the communication control section 201 corresponds to a "receiving unit" for receiving a tissue sample image via the network 240. An image storage section (image storage unit) 202 stores the received tissue sample image. An area selection section (area selection unit) 203 selects a plurality of areas from the received tissue sample image. Images in the respective selected areas are processed in an image processing section (image processing unit) 204, and a mask for each selected area is generated in a mask generation section (mask generation unit) 205. All of the selected areas are continuously processed. When the received tissue sample image has been already selected and is an image with a resolution with which the number of cells can be counted easily, a mask for the entire received tissue sample image can be generated. The received tissue sample image 206, a mark 207 enclosing each selected area, and a tissue sample image 208 of each selected area are sent to a display data generation section 210. The mask 209 generated in the mask generation section 205 is also sent to the display data generation section 210.

The display data generation section (display data generation unit) 210 generates various pieces of display data from the received tissue sample image 206, the mark 207 enclosing each selected area, the tissue sample image 208 of each selected area, and the mask 209. As the display data, desired display data is selected by the client PC 220. The selected display data is sent from the communication control section 201 to the client PC 220 via the network 240 and is displayed on a display screen. Alternatively, the selected display data is sent to the pathological image diagnosis center 230 so that specialized physicians can analyze and diagnose. That is, it can be said that the communication control section 201 corresponds to a "sending unit" for sending, via the network 240, the number of the parenchymal cells counted by the counting unit or display data generated by the display data generation unit.

<Functional Configuration of Pathological Image Diagnosis Support Apparatus 200>

Figure 3:
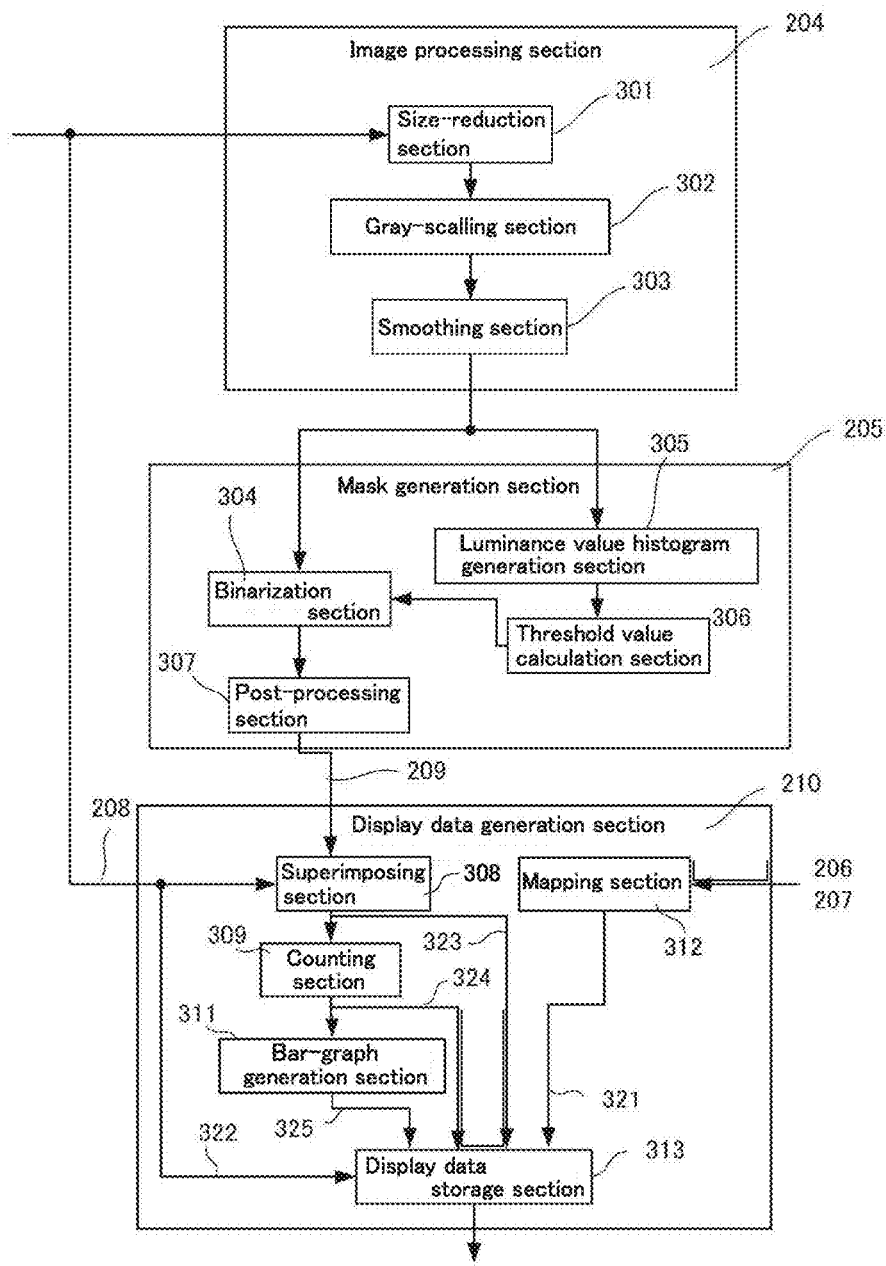
FIG. 3 is a block diagram showing a functional configuration of a pathological image diagnosis support apparatus according to the second embodiment of the present invention.

FIG. 3 is a block diagram showing configurations of the image processing section 204, the mask generation section 205, and the display data generation section 210 in further detail. In the present embodiment, an example of using an IHC-stained breast cancer tissue sample image is described. The present invention, however, is not limited thereby.

The image processing section 204 includes: a size-reduction section (size-reduction unit) 301; a gray-scaling section (gray-scaling unit) 302; and a smoothing section (smoothing process unit) 303. The size-reduction section 301 reduces the size of a tissue sample image in each selected area. The size-reduction is performed in order to fill spaces (a background color of a film on an image) specifically around parenchymal cells (in order to cause the tissue sample image to be dense with parenchymal cells). The reduction ratio as a parameter of the size-reduction is determined by a resolution of each selected area, a site of the biological tissue, and the like. The size-reduced tissue sample image in each selected area is sent to a gray-scaling section 302. The gray-scaling section 302 converts a color tissue sample image into a gray-scale image. The present embodiment shows an example of a gray scale from 0 to 255. The gray-scale image is then sent to a smoothing section 303. The smoothing section 303 smoothes the gray-scale image so that luminance values of cell nuclei and those of stromata can be separated from each other by binarization. The present embodiment shows an example of smoothing the gray-scale image using a Gaussian filter. The matrix size and the weighting in the case of using the Gaussian filter affect the result of the smoothing. In the present embodiment, the matrix size and the weighting as parameters of the smoothing are selected so that, according to the density of a part of stained stroma, the part of stained stroma in the matrix size is small, and the weighting is affected by the surrounding unstained part, for example. The order of the size-reduction section 301, the gray-scaling section 302, and the smoothing section 303 is not limited by the present embodiment. The tissue sample image generated through being processed in this image processing section 204 is also referred to as a processed tissue sample image. In the present embodiment, parenchymal cells and stromal cells are separated from each other based on luminance values of cell nuclei. The present invention, however, is not limited thereby, and they may be separated from each other according to the difference of another cell component (a cell nucleus, a cell membrane, a cytoplasm, a lymphocyte, or the like).

The mask generation section 205 includes: a binarization section (binarization unit) 304; a luminance value histogram generation section (luminance value histogram generation unit) 305; a threshold value calculation section (threshold value calculation unit) 306; and a post-processing section (post-processing unit) 307. An image which has been image-processed in the image processing section 204, specifically an image which has been smoothed in the smoothing section 303 so that stromata and cell nuclei can be separated from each other is binarized in the binarization section 304. A threshold value for this binarization is calculated in the threshold value calculation section 306 based on a luminance value histogram generated in the luminance value histogram generation section 305. In the present embodiment, dynamic programming (DP) is utilized as a preferred example of calculating a threshold value in the threshold value calculation section 306. The present invention, however, is not limited thereby, and any of the other threshold value calculation methods can be utilized. According to the studies by the inventors of the present invention, reliable threshold values obtained through various kinds of IHC staining are, for example, from 190 to 215 when the gray-scale is from 0 to 255. Thus, in the present embodiment, when a threshold value calculated by dynamic programming (DP) is less than 190, it is corrected to 190, and when it exceeds 215, it is corrected to 215.

In the binarization section 304, binarization is performed using the threshold value calculated in the threshold value calculation section 306, and a part in which luminance values are higher than the threshold value is used as a region which is a candidate of a mask (hereinafter referred to as a mask candidate region). In the post-processing section 307, the mask candidate region is subjected to various processes, so that a final mask reliable as a mask is generated. For example, many discrete points remain around the boundary between a parenchymal cell region to be observed and a stromal cell region in the mask candidate region of the binary image output from the binarization process section 304. This mask is intended to easily count the number of parenchymal cells to be observed. Thus, the parenchymal cells to be observed should be avoided from being removed by the mask. Therefore, in the post-processing section 307, for example, the discrete points are connected to the parenchymal cell region to be observed as much as possible. The discrete points are connected preferably by opening and closing, specifically preferably closing of black indicating parenchymal cells. Moreover, for example, many isolated points are scattered over the mask candidate region. Thus, it is preferred that the isolated points are removed in the post-processing section 307. For example, noises of the isolated points are removed by dilating a white region in the mask candidate region after the size reduction. Moreover, for example, unnecessary holes appear in the parenchymal cell region to be observed. When these holes are left as they are, they become parts of the mask. Thus, it is preferred that the holes are filled by closing in the black parenchymal cell region or the like in the post-processing section 307. Appropriate values are selected as parameters of the post-processing. As mentioned above, in the present embodiment, conditions under which the parenchymal cells to be observed are not removed are given high priority in selection of the values.

The display data generation section (display data generation unit) 210 includes: a superimposing section (superimposing unit) 308; a counting section (counting unit) 309; a bar-graph generation section (bar-graph generation unit) 311; a mapping section (mapping unit) 312; and a display data storage section (display data storage unit) 313. As shown in FIG. 2, the received tissue sample image 206, the mark 207 enclosing each selected area, the tissue sample image 208 of each selected area, and the mask 209 are input into the display data generation section 210 in order to generate display data. The display data generation section 210 can be configured so that other display data is generated using other data according to a request from the client PC 220. In the present embodiment, five pieces of display data are provided in the display data storage section 313. The first display data 321 is data of an image obtained by superimposing the mark 207 enclosing each selected area on the received tissue sample image 206 received in the mapping section 312 (see FIG. 6). The second display data 322 is data of the tissue sample image 208 of each selected area (see FIG. 8). The third display data 323 is data of an image obtained by superimposing the mask 209 as a negative on the tissue sample image 208 of each selected area in a superimposing section 308 (see FIG. 12). The fourth display data 324 shows values obtained by counting the number of cells with each staining intensity in the parenchymal cell region to be observed of the third display data 323 in the counting section 309 (see a part indicated by the numeral "1904" of FIG. 19). The fifth display data 325 is data of an image of a bar-graph generated in the bar-graph generation section 311 based on the count value according to each staining intensity (see FIGS. 17, 18, 20). The five pieces of display data provided in the display data storage section 313 are sent and displayed as a request from the client PC 220 or a service of the pathological image diagnosis support apparatus 200 in combination. In the present embodiment, the superimposing section (superimposing unit) 308 and the counting section (counting unit) 309 are incorporated in the display data generation section (display data generation unit) 210. The configuration of the information processing apparatus according to the present invention, however, is not limited thereby. In the present embodiment, the first display data 321 to the fifth display data 325 are used as display data as described above, and the present invention, however, is not limited thereby. For example, in the case where the number of parenchymal cells counted in the counting section 309 is merely displayed, it is not necessary to provide a unit corresponding to the "display data generation unit".

<Hardware Configuration of Pathological Image Diagnosis Support Apparatus 200>

Figure 4A:
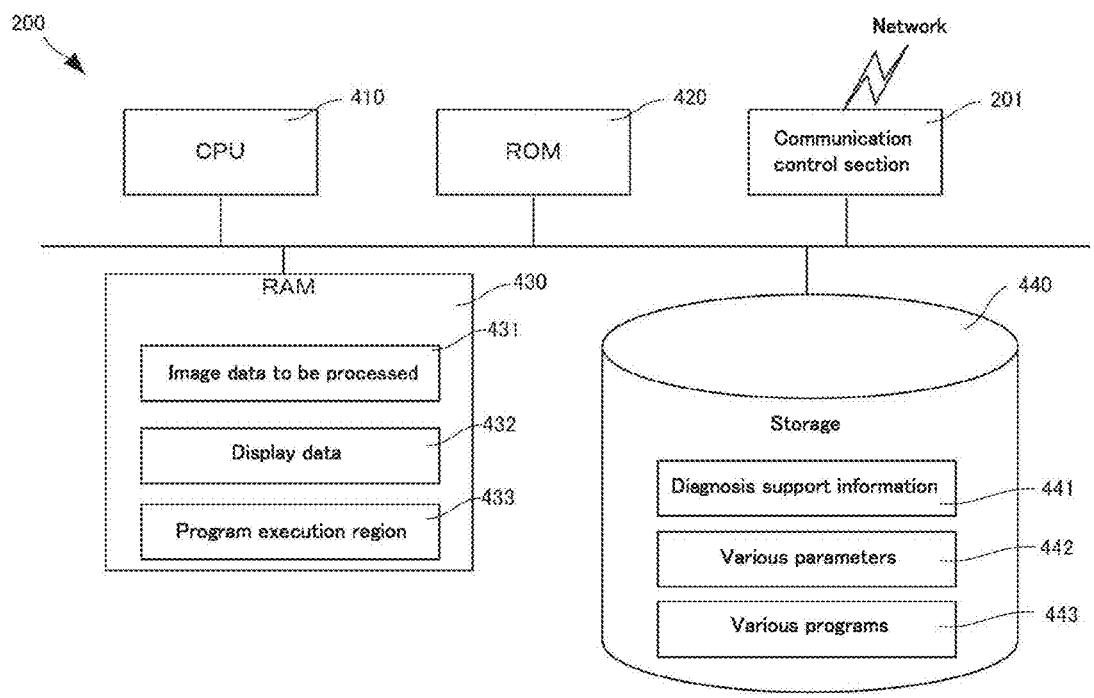
FIG. 4A is a block diagram showing a hardware configuration of a pathological image diagnosis support apparatus according to the second embodiment of the present invention.

FIG. 4A is a block diagram showing a hardware configuration of the pathological image diagnosis support apparatus 200 as an information processing apparatus according to the second embodiment. As shown in FIG. 4A, the pathological image diagnosis support apparatus 200 includes: a CPU (Central Processing Unit) 410; a ROM (Read Only Memory) 420; a communication control section 201; a RAM (Random Access Memory) 430; and a storage 440.

In FIG. 4A, the CPU 410 is an arithmetic and control processor and executes programs so that functions of sections of FIGS. 2 and 3 can be achieved. The ROM 420 stores fixed data such as initial data and initial programs and programs. As described for FIG. 2, the communication control section 201 communicates, via the network 240, with client PCs 220 and the pathological image diagnosis center 230 etc. which are outside devices.

The RAM 430 is used as a working area for temporal storage by the CPU 410. The RAM 430 reserves a region for storing the following data necessary to achieve the present embodiment. That is, the RAM 430 includes a region for temporary storing image data 431 to be subjected to various processes according to the present embodiment and display data 432 to be sent to a client PC 220 via the communication control section 201. The RAM 430 further includes a program execution region 433.

The storage 440 is a nonvolatile storage of diagnosis support information 441, various parameters 442, and various programs 443.

Figure 4B:
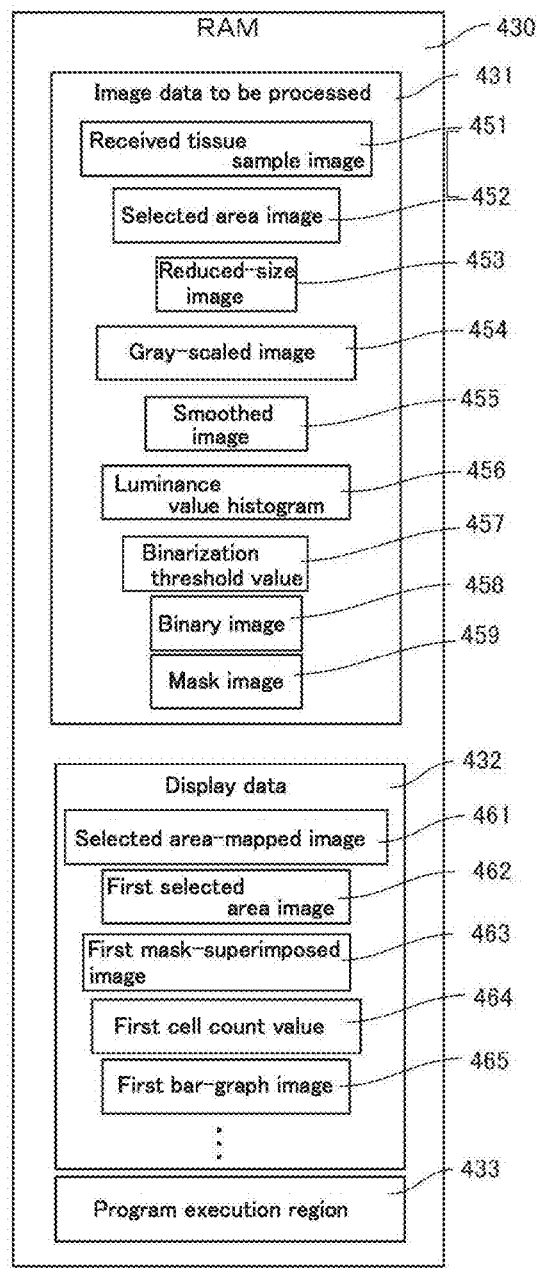
FIG. 4B is a block diagram showing another hardware configuration of the pathological image diagnosis support apparatus according to the second embodiment of the present invention.

As shown in FIG. 4B, the image data 431 to be processed in the RAM 430 includes the following data.

a tissue sample image 451 received via the communication control section 201 an image 452 of one area selected from the received tissue sample image a reduced-size image 453 obtained by reducing the size of the image of the selected area so as to fill spaces therein a gray-scale image 454 obtained by converting the reduced-size image 453 into gray-scale a smoothed image 455 obtained by smoothing the gray-scale image 454 a luminance value histogram 456 generated from the smoothed image 455 a binarization threshold value 457 for binarization, calculated based on the luminance value histogram 456 a binary image 458 obtained by binarizing the gray-scale image a mask image 459 for deleting a stromal region, obtained by post-processing the binary image such as connection of discrete points, deletion of isolated points, and filling of holes The display data 432 includes the following data.

a selected area-mapped image 461 obtained by mapping the selected area into the received tissue sample image the first selected area image 462 of the first selected area the first mask-superimposed image 463 obtained by masking the first selected area image 462 with the mask image the first cell count value 464 as the counted number of cancer cells with each staining intensity in the mask-superimposed image the first bar-graph image 465 generated based on the counted number of cancer cells with each staining intensity The same kind of data is included in display data 432 for each of subsequent selected areas.

Figure 4C:
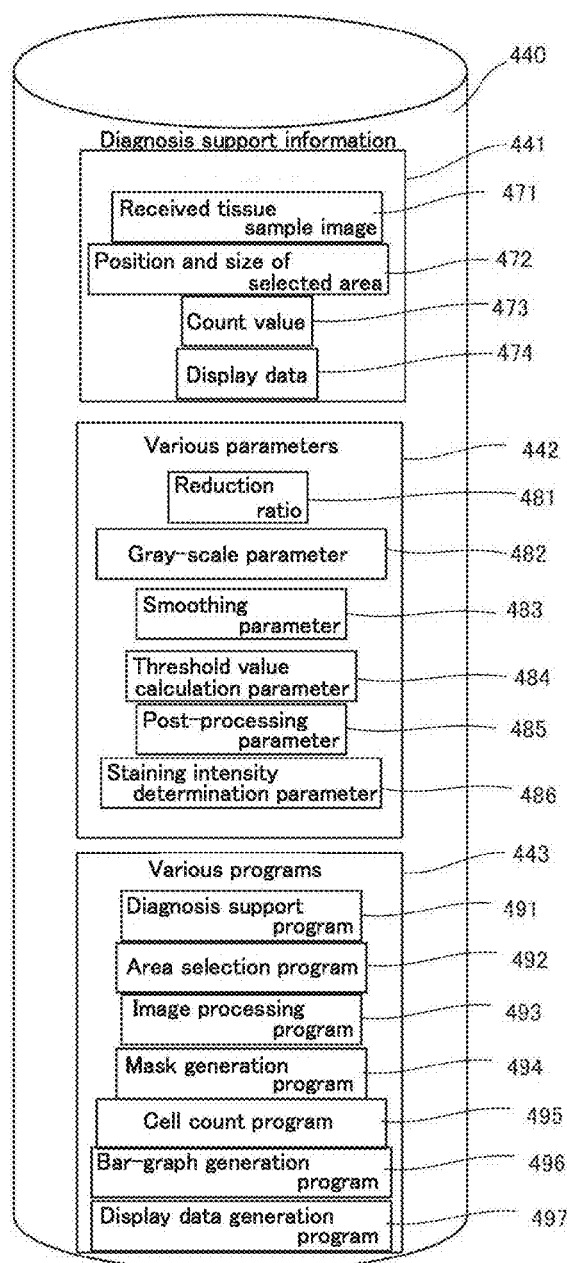
FIG. 4C is a block diagram showing yet another hardware configuration of the pathological image diagnosis support apparatus according to the second embodiment of the present invention.

As shown in FIG. 4C, the diagnosis support information 441 in the storage 440 includes the following data.

a received tissue sample image 471 the position and size 472 of the selected area as a partial region selected from the tissue sample image the count value 473 relating to cancer cells in the selected area processed display data 474 stored so as to be searchable by the tissue sample image, the patient, the case, and the like As shown in FIG. 4C, various parameters 442 in the storage 440 include the following parameters.

a reduction ratio 481 for use in size-reduction a gray-scale parameter 482 for use in changing into a gray-scale image a smoothing parameter 483 for use in smoothing, such as the matrix size and the weighting in a process using a Gaussian filter a threshold value calculation parameter 484 for calculating a binarization threshold value The maximum value and the minimum value of the threshold value are stored in the storage 440 in addition to parameters for dynamic programming.

a post-processing parameter 485 for post-processing such as connection of discrete points, deletion of isolated points, and filling of holes a staining intensity determination parameter 486 for determining the extent of staining of cell membrane in each cell by IHC staining In the case where a score (on a scale of 0, +1, +2, and +3) is determined from the proportion of the number of cells with each staining intensity, the score is also stored.

Figure 5:
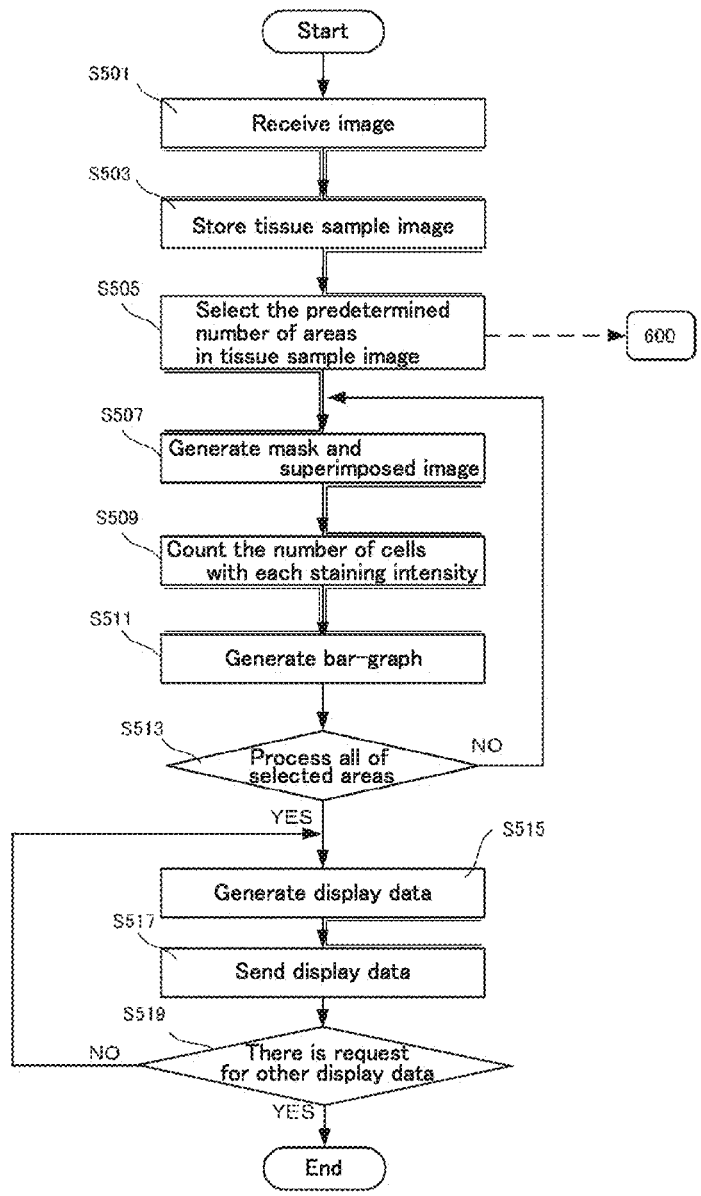
FIG. 5 is a flowchart showing a procedure for operating the pathological image diagnosis support apparatus according to the second embodiment of the present invention.
Figure 7:
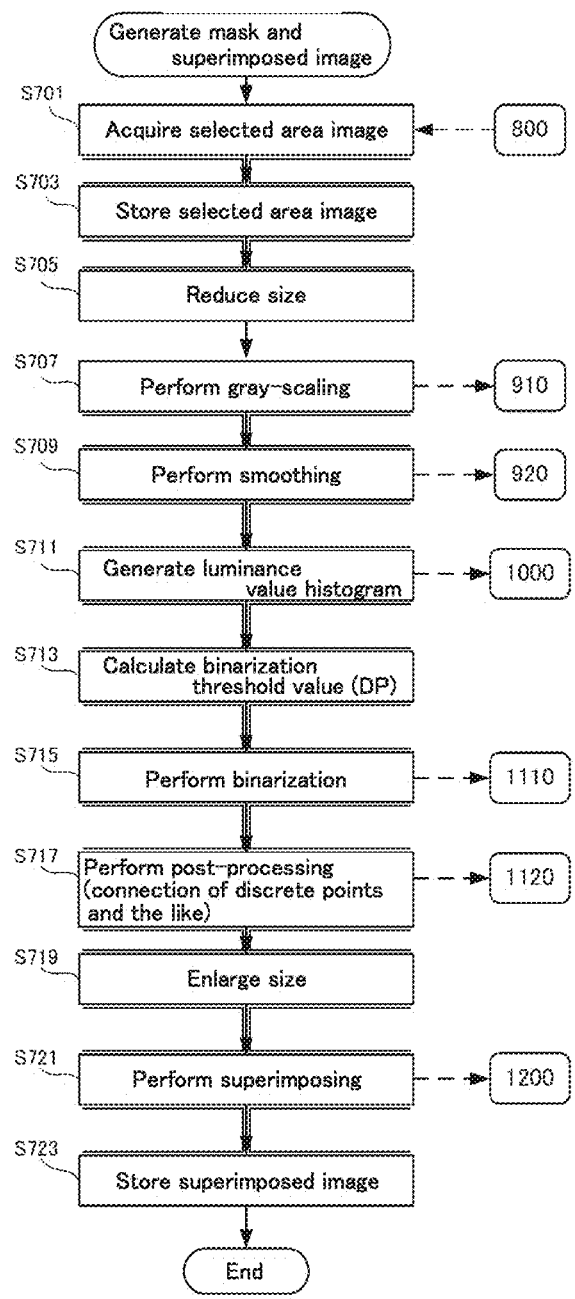
FIG. 7 is a flowchart showing a procedure for generating a mask and a superimposed image according to the second embodiment of the present invention.
Figure 13:
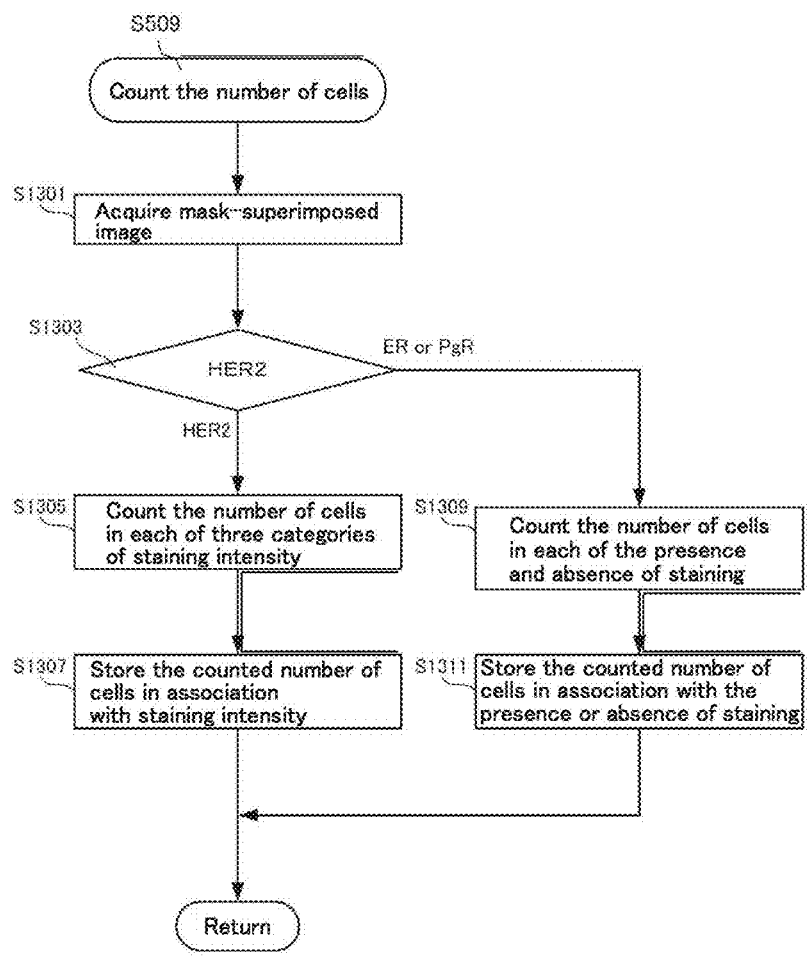
FIG. 13 is a flowchart showing a procedure for counting the number of cells according to the second embodiment of the present invention.
Figure 14:
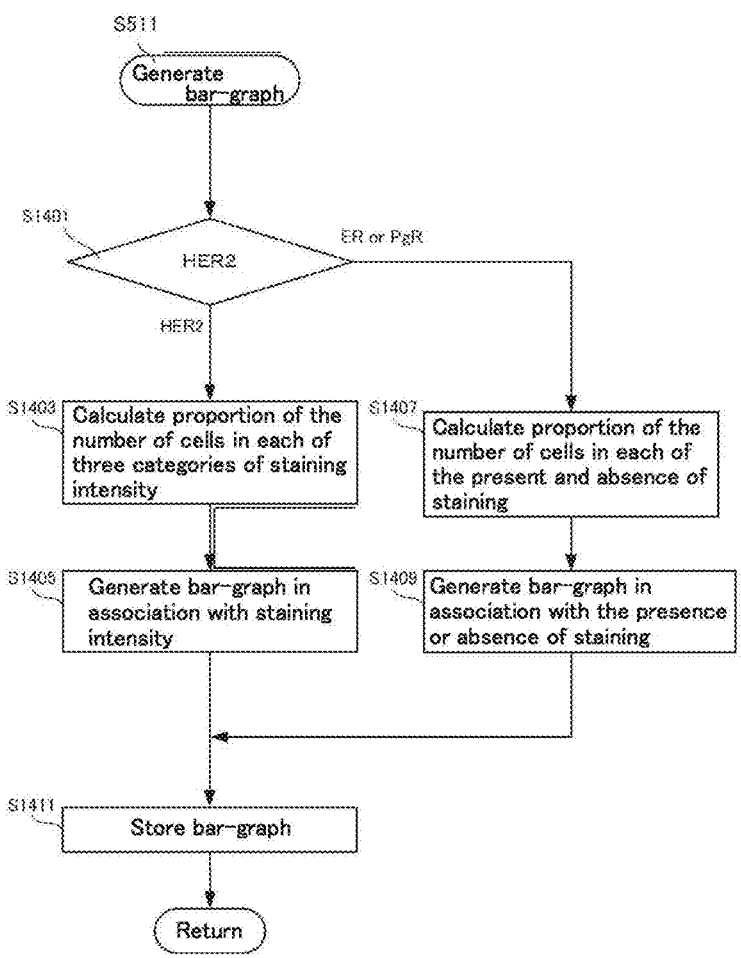
FIG. 14 is a flowchart showing a procedure for generating a bar-graph according to the second embodiment of the present invention.
Figure 16:
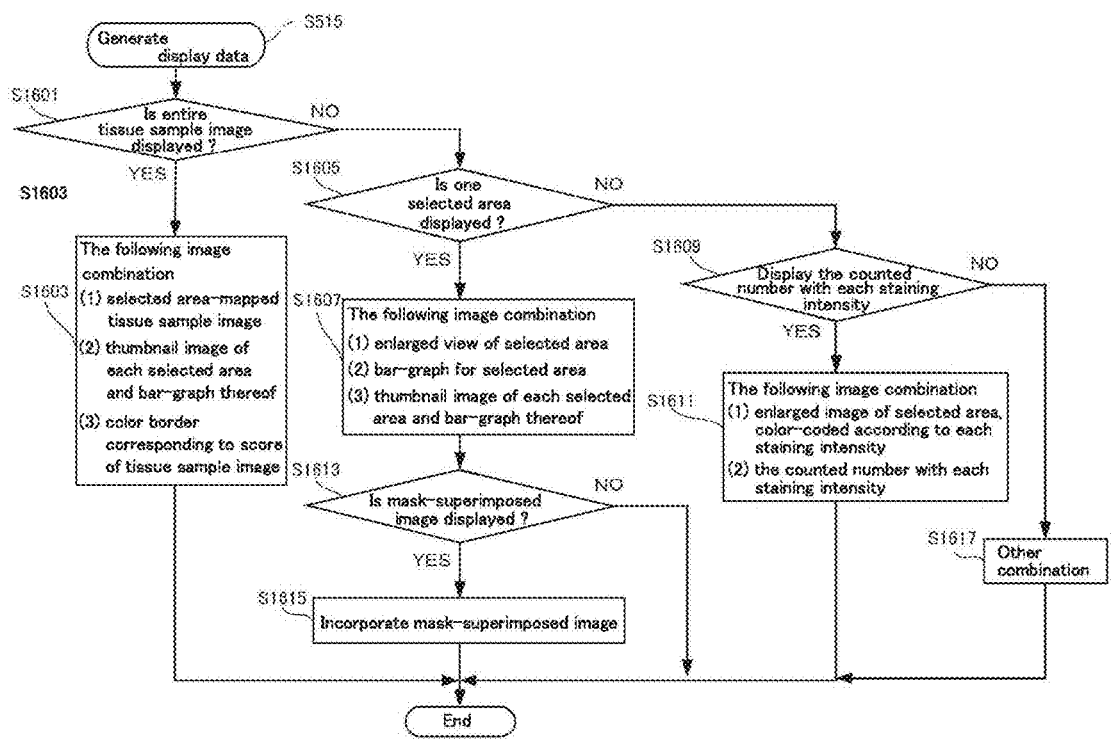
FIG. 16 is a flowchart showing a procedure for generating display data according to the second embodiment of the present invention.

As shown in FIG. 4C, various programs 443 in the storage 440 includes the following programs.

a diagnosis support program 491 for supporting diagnosis an area selection program 492 for selecting a cancer cell area from the tissue sample image an image processing program 493 for achieving processes in the image processing section 204 (for executing S701 to S709 of FIG. 7)

a mask generation program 494 for achieving processes in the mask generation section 205 (for executing S711 to S719 of FIG. 7)

a cell count program 495 for counting the number of cells with each staining intensity in the image of the selected area with a mask (for executing S509 of FIG. 5 (specifically see FIG. 13)

a bar-graph generation program 496 for generating a bar-graph showing the proportion of the number of cells from the counted number of cells with each staining intensity (executing S511 of FIG. 5 (specifically see FIG. 14)

a send data generation program 497 for generating display data for a service to a client PC 220 via the network 240 (for executing S515 of FIG. 5 (specifically see FIG. 16)

<Procedure for Operating Pathological Image Diagnosis Support Apparatus 200>

A procedure for operating a pathological image diagnosis support apparatus 200 having the above-described configuration is described in detail below with reference to flowcharts and examples of display screens. A CPU 410 executes programs shown in each flowchart so that functions of the components in FIGS. 2 and 3 are achieved.

(Procedure for Supporting Diagnosis)

FIG. 5 is a flowchart showing an overall procedure for supporting diagnosis in the present embodiment.

In a step S501 (receiving step), the pathological image diagnosis support apparatus 200 waits for a tissue sample image to be sent from a client PC 220. When the pathological image diagnosis support apparatus 200 receives a tissue sample image, it is stored in a step S503. Then, in a step S505, the predetermined number of areas are selected from the received tissue sample image.

Figure 6:
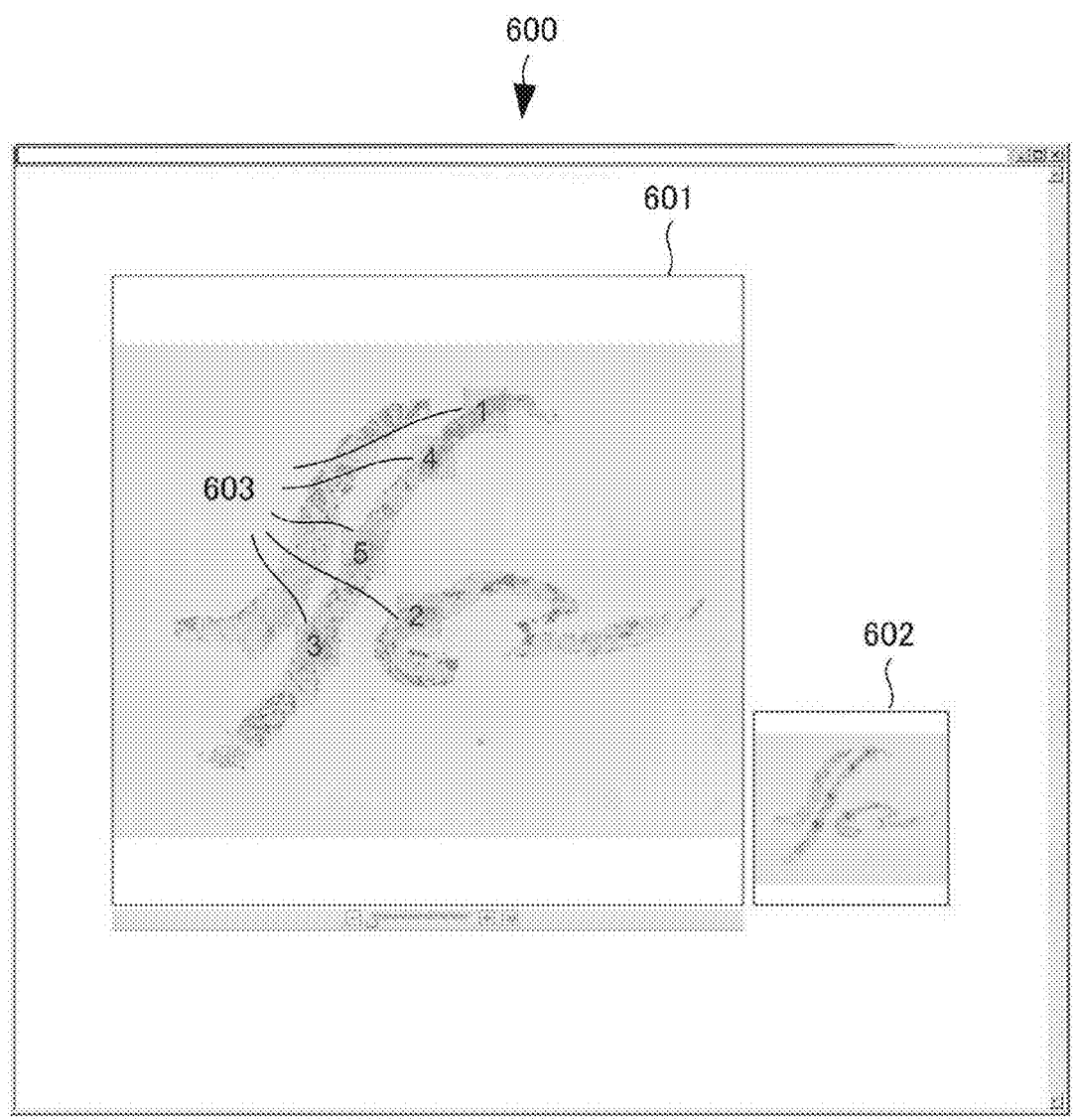
FIG. 6 is a figure showing an example of a tissue sample image to be diagnosed in the second embodiment.

FIG. 6 shows an example of displaying the selected areas on the tissue sample image. A display screen 600 of FIG. 6 includes: a received tissue sample image 601; and a reduced-size image 602 thereof. The numeral 603 indicates the selected areas for each of which a mask is generated in the present embodiment. In FIG. 6, automatically selected five areas indicated by the numeral "1" to "5" are shown. A known method can be used as an algorithm for selecting areas, or areas may be selected by a user with the client PC 220. The display on this display screen 600 may be sent to the client PC 220 so that a user can check the display, and this, however, is not included in FIG. 5.

Thereafter, each of the selected areas is processed in steps S507 to S513 until all of the selected areas are processed. First, in the step S507 (a mask generating step and a superimposing step), a mask for removing stroma is generated for a tissue sample image of each selected area, and the generated mask is superimposed on the tissue sample image so as to mask a stromal part, so that a superimposed image is generated (FIG. 7). In the step S509 (counting step), the number of cells with each staining intensity in the tissue sample image of each selected area with the mask is counted (FIG. 13 described below). In the step S511 (a part of a display data generating step), a bar-graph showing the proportion of the number of cells with each staining intensity, determined in the step S509 is generated (FIG. 14). Any of various methods can be used as a method for distinguishing staining intensity when the proportion of the number of cells with each staining intensity is shown. In the present embodiment, a bar-graph in which each proportion is color-coded with a different color is generated. Subsequently, in the step S513, whether or not all of the selected areas are processed completely is determined, and if any of the selected areas has not been processed yet, the steps from S507 are performed.

When all of the selected areas are processed completely, display data is generated in a step S515 (the other part of a display data generating step) (FIG. 16). In a step S517 (sending step), the display data generated in the step S515 is sent to the client PC 220 (or the pathological image diagnosis center 230) via the network 240. In a step S519, whether or not the processes are completed is determined, and if another piece of display data is required, display data is generated and sent in the step S515.

(Procedure for Generating Mask and Superimposed Image S507)

FIG. 7 is a flowchart showing a detailed procedure for generating a mask and a superimposed image shown in the step S507 of FIG. 5.

Figure 8:
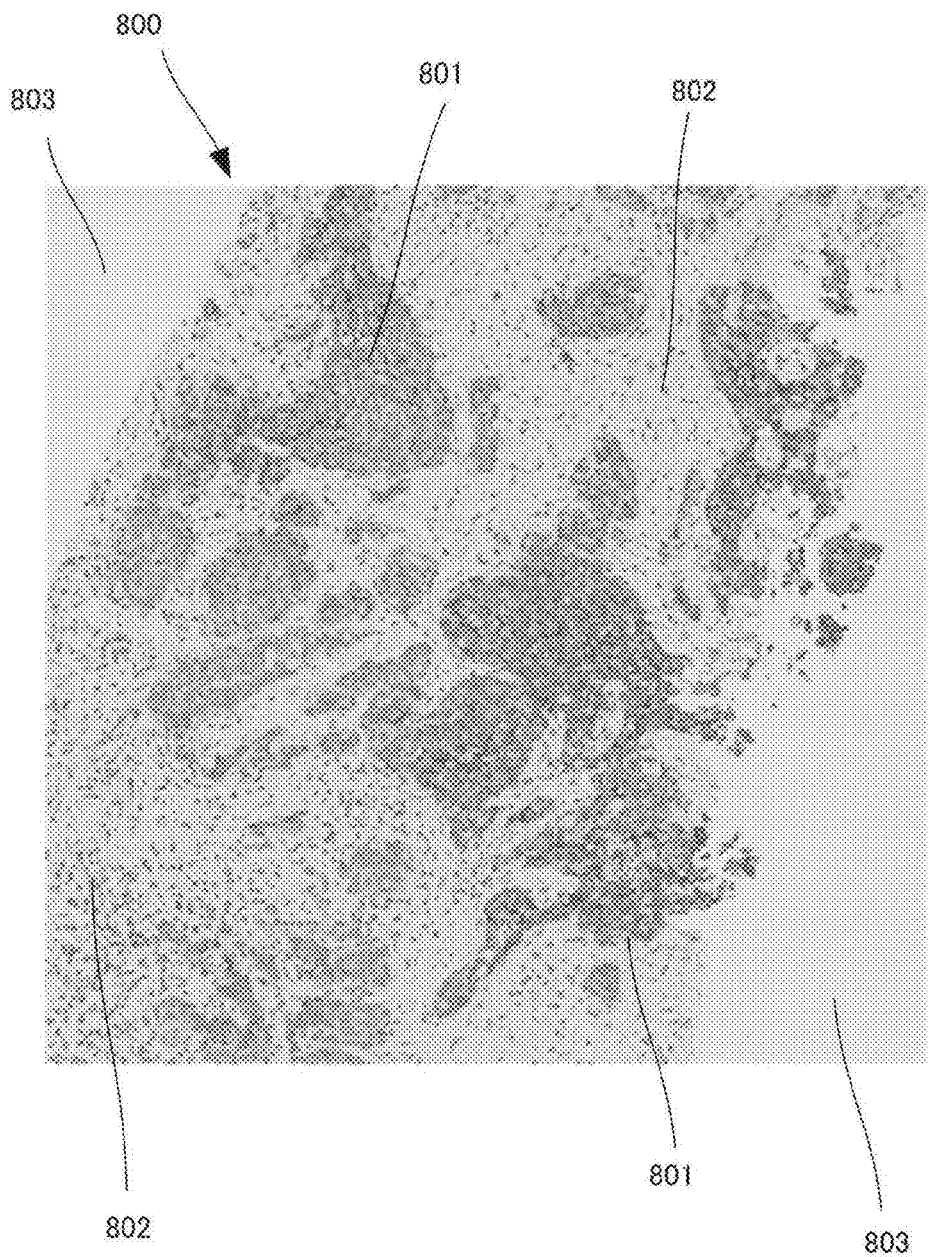
FIG. 8 is a figure showing an example of one area selected from FIG. 6.

First, in a step S701, a tissue sample image of one selected area is acquired. FIG. 8 is an enlarged view displayed when the selected area indicated by the numeral "3" (hereinafter referred to as the "third selected area") is selected among the five selected areas 603 of FIG. 6. The third selected area 800 includes: a region 801 of cancer parenchymal cells observed as a dense mass (hereinafter referred to as a "cancer parenchymal cell region"); a region 802 of stromal cells in which dark discrete points are spread (hereinafter referred to as a "stromal cell region"); and a region 803 of background which is not the tissue sample image (hereinafter referred to as a "background region") (e.g., a preparation in the case of using a microscope). FIG. 8 is a black-and-white image. Actually, however, the region 801 is a region dense with nuclei stained light blue and cell membranes around the nuclei, stained brown, and the region 802 is a region in which lymphocytes and the like stained deep blue are spread. The staining intensity of the cell membrane is described in the next section describing counting the number of cells.

Figure 9:
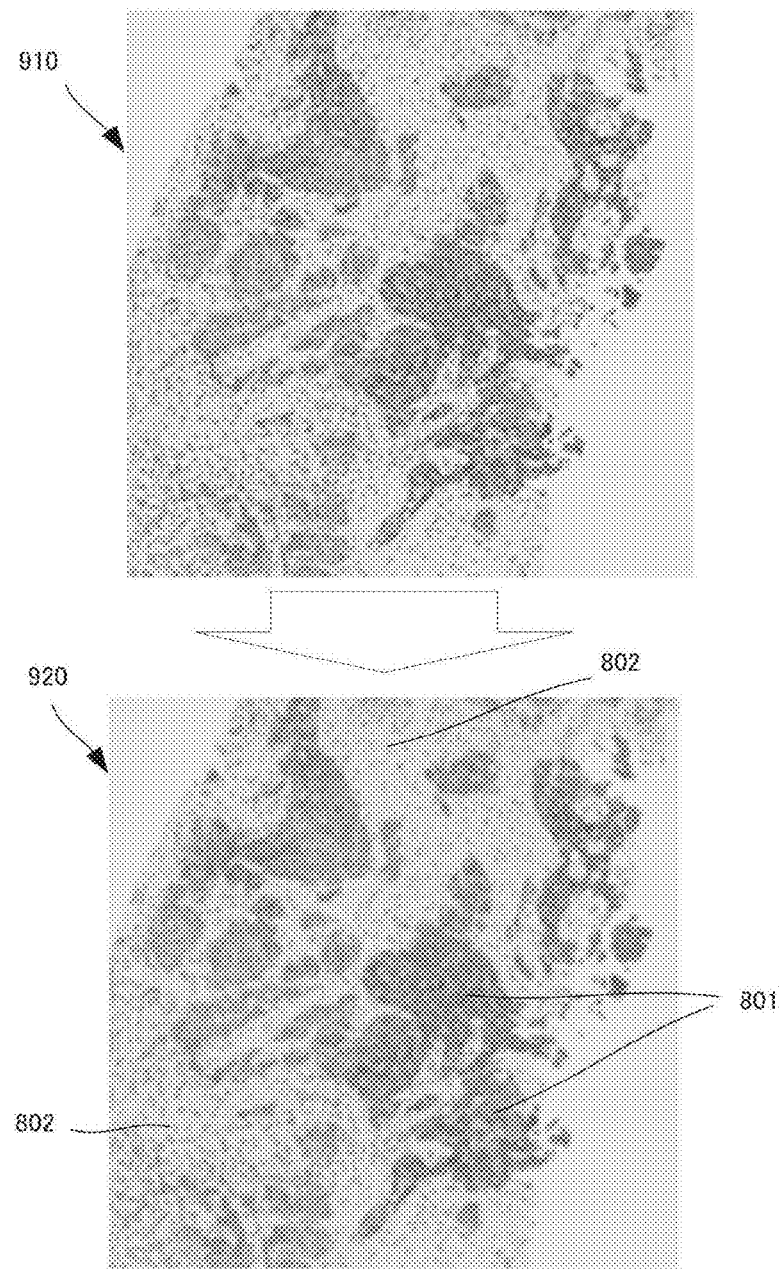
FIG. 9 shows a figure showing an example of reducing the size of the selected area of FIG. 8 and a figure showing an example of smoothing the selected area.

In a step S703 of FIG. 7, the acquired tissue sample image of the selected area is stored. A series of processes in the subsequent steps S705 to S709 corresponds to a series of processes in the image processing section 204. In the step S705 (size-reducing step), the size of the acquired tissue sample image of the selected area is reduced specifically in order to fill spaces in the cancer parenchymal cell region 801 of the tissue sample image other than cells. Then, in the step S707 (gray-scaling step), a color image is converted into a gray-scale image, for example, in the luminance value from "0" to "255" in the present embodiment. The upper image 910 of FIG. 9 is an image obtained after the size-reduction and the conversion into the gray-scale image. Thereafter, in the step S709 (image processing step), the upper image 910 of FIG. 9 is smoothed (using a Gaussian filter in the present embodiment), so that the image is changed to the lower image 920 of FIG. 9. In the lower image 920 of FIG. 9, the contrast in the cancer parenchymal cell region 801 is decreased by the smoothing, so that the region becomes a mass. The stromal cell region 802 is affected by surrounding pixels having high luminance values, so that luminance values of spreading stromal cell nuclei stained deep blue are changed to high.

Figure 10:
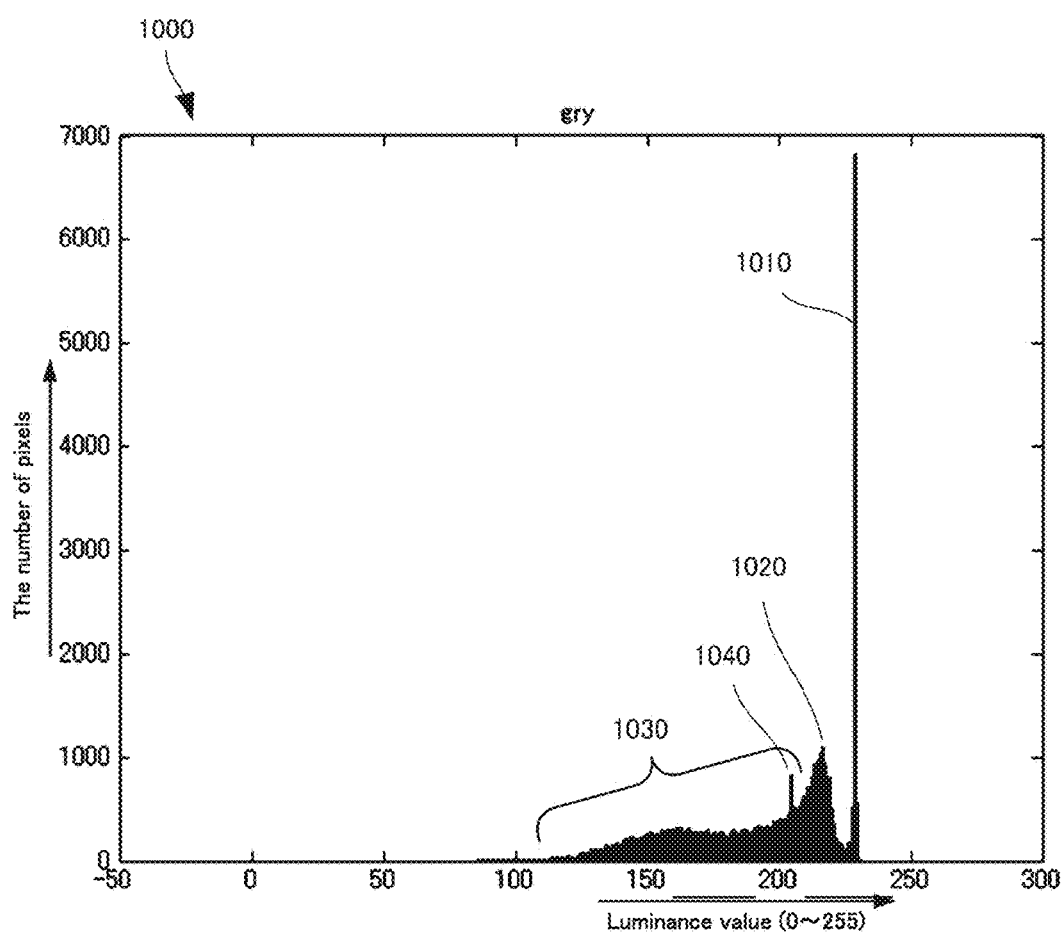
FIG. 10 is a figure showing an example of a luminance value histogram generated based on the lower figure of FIG. 9 and an example of a binarization threshold value calculated based on the luminance value histogram.

A series of processes in subsequent steps S711 to S719 corresponds to a series of processes in the mask generation section 205. First, in the step S711 (luminance value histogram generating step), a luminance value histogram based on the smoothed image 920 is generated. FIG. 10 shows an example of a luminance value histogram 1000 generated based on the lower image 920 of FIG. 9. The horizontal axis indicates the luminance value from "0" to "255", and the vertical axis indicates the number of pixels. As shown in FIG. 10, in the present embodiment, the luminance values in the image 920 are from around "80" to around "230". A peak 1010 at the number of pixels having the highest luminance value (the brightest) indicates the background region 803 (in a color of the preparation in a part which is not a tissue). A peak 1020 having a luminance value next to the highest luminance value (light color) indicates the stromal cell region 802. A part 1030 having a low luminance value (deep color) indicates a cancer parenchymal cell region 801. A peak 1040 in the part 1030 indicates cell nucleus of parenchymal cell. In the step S713 (threshold value calculating step), a favorable binarization threshold value for separating the stromal cell region 802 from the cancer parenchymal cell region 801 is calculated by dynamic programming. In the present embodiment, a binarization threshold value is calculated by dynamic programming, and the present invention, however is not limited thereby. The difference in luminance value between the stromal cell region 802 and the cancer parenchymal cell region 801 is significantly big by the smoothing and the like. Therefore, even though a calculated threshold value is different according to the method of calculating a threshold value, the stromal cell region 802 and the cancer parenchymal cell region 801 can be separated from each other by binarization.

Figure 11:
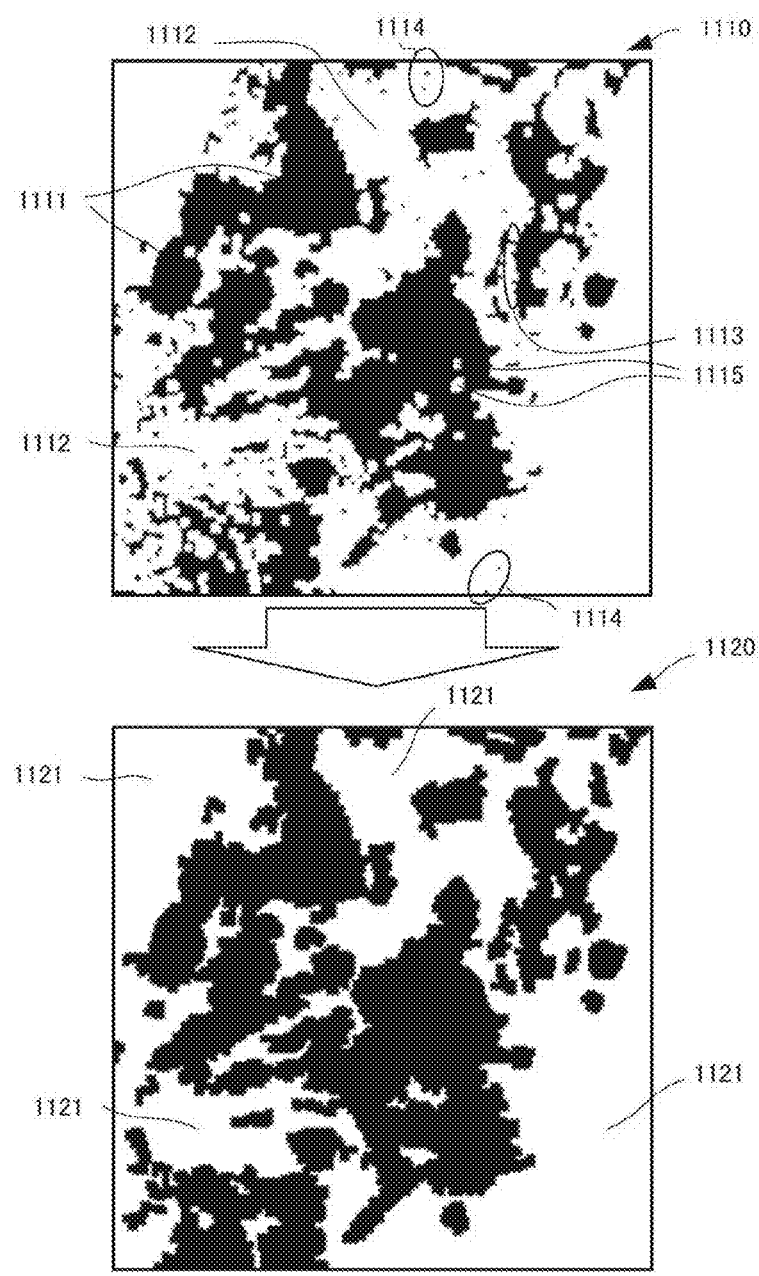
FIG. 11 shows a figure showing an example of a result obtained by binarizing the lower figure of FIG. 9 with the threshold value shown in FIG. 10 and a figure showing an example of post-processing the result obtained by the binarization.

In the step S715 (binarizing step), the tissue sample image of the selected area obtained after the smoothing is binarized using the threshold value calculated in the step S713. The upper image 1110 of FIG. 11 shows a tissue sample image of the selected area obtained after the binarization. The numeral 1111 indicates a cancer parenchymal cell region having "0" (black) by binarization, the numeral 1112 indicates a stromal cell region having "255" (white) by binarization. In a binary image which is the upper image 1110 of FIG. 11, discrete points 1113 spread from the mass of parenchymal cells remain between the parenchymal cell region and the stromal cell region. Moreover, isolated points 1114 remain in the white stromal cell region, and small holes 1115 remain in the black parenchymal cell region. In the step S717 (post-processing step), post-processing is performed in order to connect or delete these specific points.

In order to connect the discrete points 1113, opening and closing are performed. In order to remove the isolated points 1114, the white region is dilated. In order to fill the small holes 1115, the holes in the black region is filled by closing or the like. Which size of black part is regarded as a discrete point or an isolated point, or which size of white part is regarded as a hole can be selected based on empirical values thereof, for example. Specifically, for example, appropriate parameters can be selected based on the zoom ratio or the resolution of image and empirical values thereof. Basically, since the purpose is to count the number of cells with each staining intensity in a black region (which is not masked), parameters are decided so that a region including cells is not masked, and the black region remains. The lower image 1120 of FIG. 11 shows an example of an image obtained after post-processing. In FIG. 11, a white region indicated by the numeral 1121 is a region to be a mask. As can be seen from the comparison with the upper image 1110 of FIG. 11, the discrete points 1113 are connected to the black region, the isolated points 1114 are removed, and the small holes 1115 are filled by the post processing.

In the step S719, the image obtained after the post-processing (the lower image 1120 of FIG. 11) is enlarged at the same ratio as used in the size-reduction performed in the step S705, and a proper mask is generated using the white region as a mask region.

Figure 12:
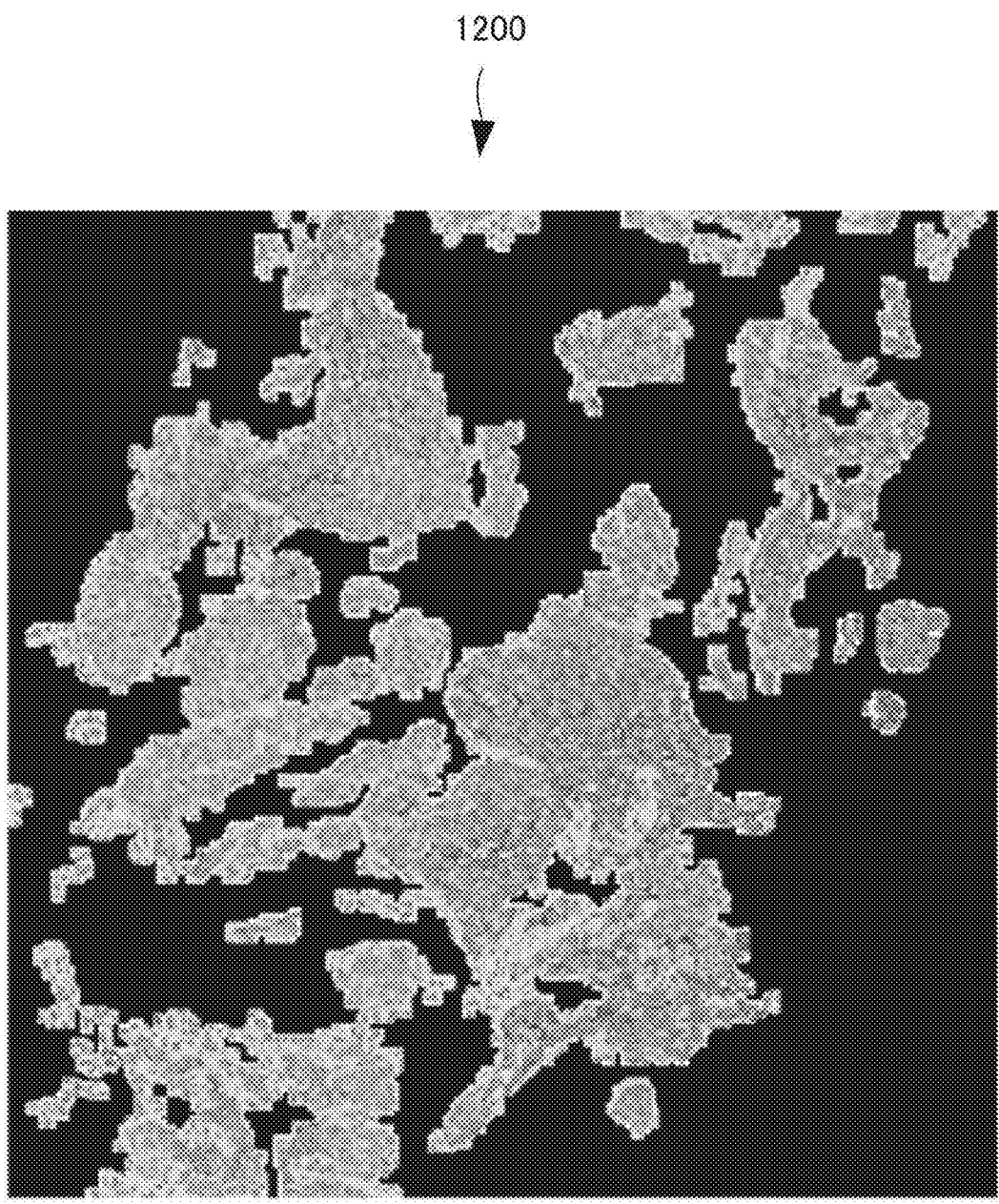
FIG. 12 is a figure showing an example of a result obtained by masking the selected area of FIG. 8 with a mask generated based on the lower figure of FIG. 11.

Subsequently, in a step S721, the generated mask is superimposed on the original tissue sample image of the selected area, so that the mask region is removed. Thus, a tissue sample image 1200 of the selected area with the mask is generated as shown in FIG. 12. In a step S723, the tissue sample image 1200 of the selected area with the mask is stored in association with the selected area ID by which the selected area is distinguished.

(Procedure for Counting the Number of Cells S509)

FIG. 13 is a flowchart showing a detailed procedure for counting the number of cells shown in S509 of FIG. 5.

First, in a step S1301, a mask-superimposed image (see FIG. 12) stored in S723 of FIG. 7 is acquired. In a step S1303, whether the receptor in the IHC staining of the present embodiment is "HER2" or any of "ER" and "PgR" is determined. When the receptor is "HER2", the cell membrane is stained, so that the change in staining intensity can be observed. Thus, in a step S1305, the number of cells in each of three categories of staining intensity (none, weak, and strong) is counted in the present embodiment. The "none" indicates a cell in which a cell nucleus is stained blue, and a cell membrane is not stained. The "weak" indicates a cell in which a part of a cell membrane is stained brown. The "strong" indicates a cell in which the whole cell membrane is stained and have a closed curve. In a step S1307, the counted number of cells with each staining intensity is stored in association with the staining intensity.

When the receptor is "ER" or "PgR", cell nuclei are stained, so that the staining is categorized into "present" or "none". Therefore, in a step S1309, the number of cells in each of the presence and absence of the staining of cell nuclei is counted. Then, in a step S1311, the number of cells is stored in association with the presence or absence of the staining.

(Procedure for Generating Bar-Graph S511)

FIG. 14 is a flowchart showing a detailed procedure for generating a bar-graph indicated by S511 of FIG. 5.

First, in a step S1401, whether the receptor in the IHC staining of the present embodiment is "HER2" or any of "ER" and "PgR" is determined. When the receptor is "HER2", the proportion of the number of cells in each of the three categories of staining intensity is calculated in a step S1403. In the present embodiment, the proportion of the number of cells with each staining intensity is indicated by percentage, assuming that the proportion of the total number of cells is 100%. Subsequently, in a step S1405, a bar-graph in which each proportion is color-coded so that three categories of staining intensity are distinguished from one another is generated. In the present embodiment, a bar-graph in which the proportion of the number of cells in "none" of the staining is indicated by green, that in "weak" of the staining is indicated by yellow, and that in "strong" of the staining is indicated by red in this order (none: green—weak: yellow—strong: red) is generated.

When the receptor is "ER" or "PgR", the proportion of the number of cells in each of the presence and absence of the staining is determined in a step S1407, and a bar-graph in which the proportion of the number of cells in "none" of the staining is indicated by green, and that in the "presence" of the staining is indicated by red in this order (none: green—presence: red) is generated in a step S1409. In a step S1411, the generated bar-graph is stored in association with the selected area of the tissue sample image.

The bar-graph added to the display data is useful as auxiliary information in the case where a score of reactivity of cell membrane in the selected area of the tissue sample image is determined. For example, the score (+3, +2, +1, 0) of HER2 is determined according to the proportion of the number of cells with strong staining intensity, a combination of the proportion with strong staining intensity and that with weak staining intensity, and the like as determination criteria. Therefore, if the proportion or the combination is determined or accessorily determined visually, it is useful in diagnosis based on the tissue sample image. Thus, the present embodiment shows an example of normalizing by the percentage. If it is necessary to check the total number of cells, the proportion thereof may be shown with indicating each actual number of cells by a different color.

Even though automatic score determination is not mentioned in the present embodiment, a score of each selected area and a score of the entire tissue sample image as a result thereof may be automatically determined.

(Configuration of Display Data Storage Section 313)

Figure 15:
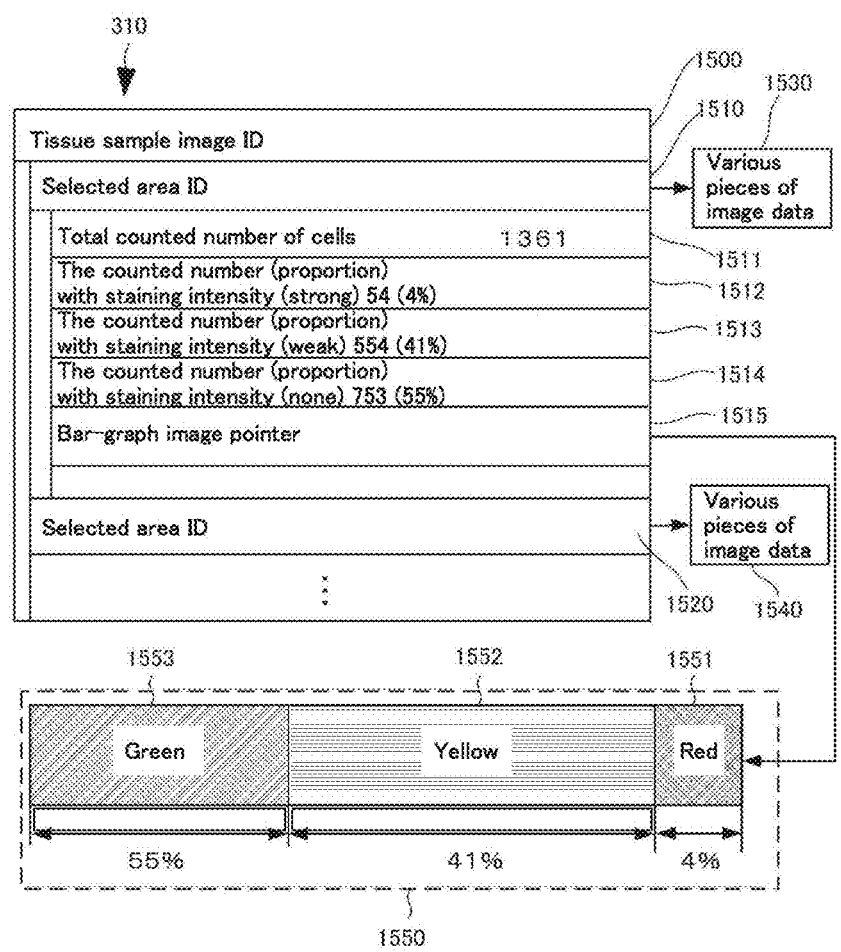
FIG. 15 is a figure showing a configuration of storing data in the case of counting the number of cells in the selected area with a mask of FIG. 12 and then generating a bar-graph by processes of the second embodiment.

FIG. 15 is a figure showing a configuration of the display data storage section 313 of FIG. 3. The configuration of the display data 432 in the RAM 430 and that of the display data 474 in the storage 440 may be similar to the respective configurations of FIG. 15.

FIG. 15 shows a configuration of one received tissue sample image 310. As shown in FIG. 15, the tissue sample image 130 includes: a plurality of selected area IDs 1510 and 1520 in association with a tissue sample image ID 1500. The tissue sample image 310 also holds various pieces of image data 1530 and 1540 (a tissue sample image without a mask, a tissue sample image with a mask, and the like) in association with selected area IDs 1510 and 1520. The tissue sample image 310 further stores: the total counted number of cells 1511; the number of cells with staining intensity (strong) and the proportion thereof 1512; the number of cells with staining intensity (weak) and the proportion thereof 1513; and the number of cells with staining intensity (none) and the proportion thereof 1514 in association with the selected area ID 1510. The tissue sample image 310 further stores: a bar-graph image 1550 generated through being pointed with a bar-graph image pointer. In the bar-graph image 1550, the length of the red bar 1551, the length of the yellow bar 1552, and the length of the green bar 1553 correspond to the proportion with staining intensity (strong), the proportion with staining intensity (weak), and the proportion with staining intensity (none), respectively.

In the present embodiment, data based on one received tissue sample image is managed in the display data storage section 313, and the present invention, however, is not limited thereby. For example, a plurality of images stored according to a diagnosis history may be managed by the patient ID, the hospital ID, the case ID, and the like through including the diagnosis history in data stored in the display data storage section 313.

(Procedure for Generating Display Data)

FIG. 16 is a flowchart showing a detailed procedure for generating display data indicated by S515 of FIG. 5. The display data may be previously provided as a service of the pathological image diagnosis support apparatus as in the present embodiment or may be generated in response to a request from a cleint PC 220 by a user. In the latter case, display data is generated dialogically, and this, however, is not described in detail.

In a step S1601, whether or not the entire received tissue sample image is displayed in S515 is determined. When the entire received tissue sample image is displayed, selected areas are mapped into the tissue sample image in a step S1603, and a bar-graph is added to a thumbnail image of each selected area. Further, an image indicating the scores in the tissue sample image by color borders is added. Such display image is generated as display data.

Figure 17:
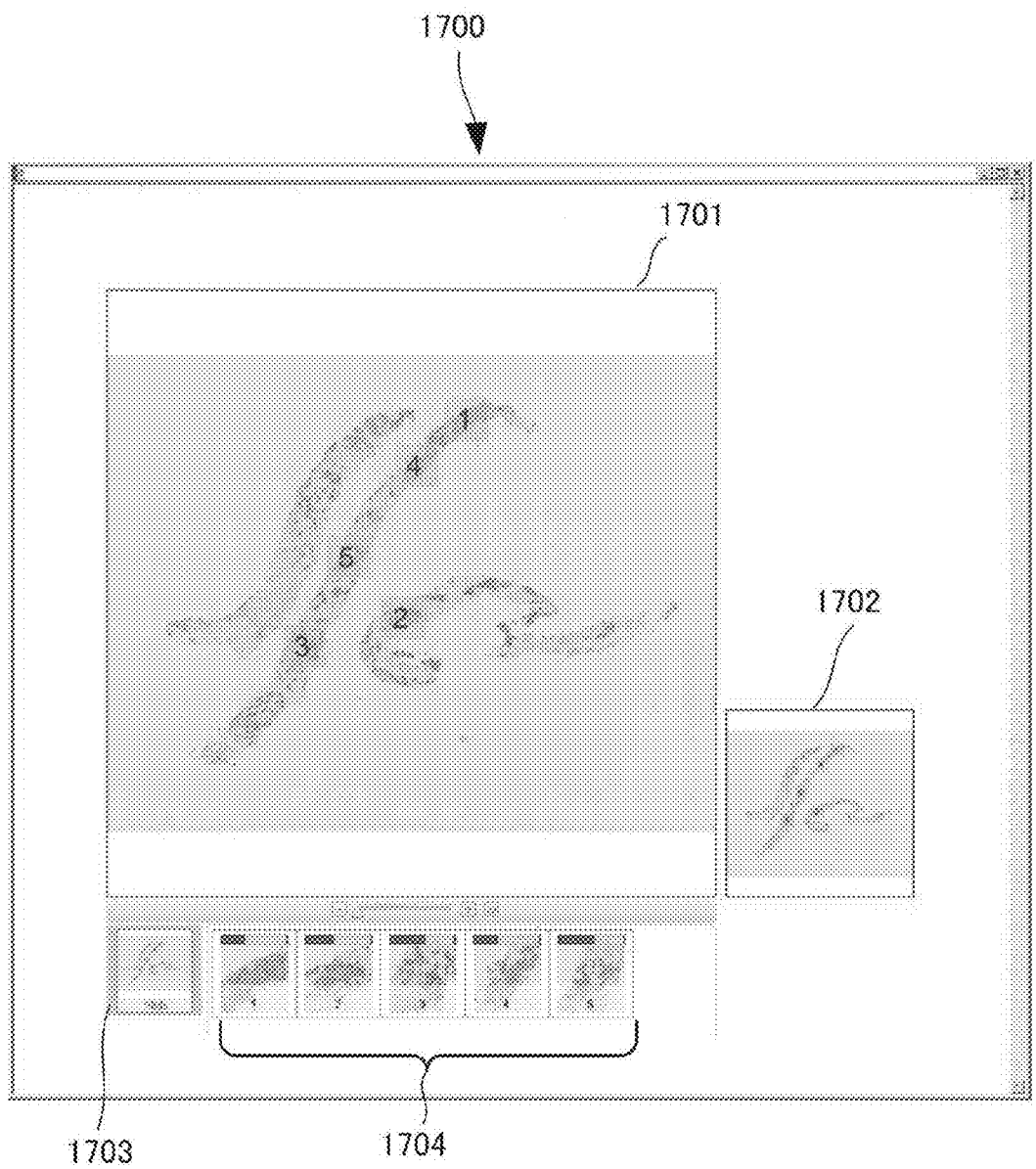
FIG. 17 is a figure showing the first display example of display data generated by processes of the second embodiment.

FIG. 17 is a figure showing a display screen 1700 obtained by displaying the display data generated in the step S1603 on a client PC 220. As shown in FIG. 17, the display screen 1700 includes: a tissue sample image 1701 with five selected areas superimposed thereon; a reduced-size image 1702 of the tissue sample image; a thumbnail image 1703 of the tissue sample image with color borders according to the respective scores; and thumbnail images 1704 of the the respective five selected areas each with a bar-graph. This thumbnail images 1703 and 1704 serve as buttons for selecting a display image by a user.

In a step S1605, whether or not one selected area is displayed in S515 is determined. When one selected area is displayed, an image obtained by adding a bar-graph corresponding to the selected area to an enlarged image of the one selected area and adding a bar-graph to a thumbnail image of each selected area is generated as display data in a step S1607.

Figure 18:
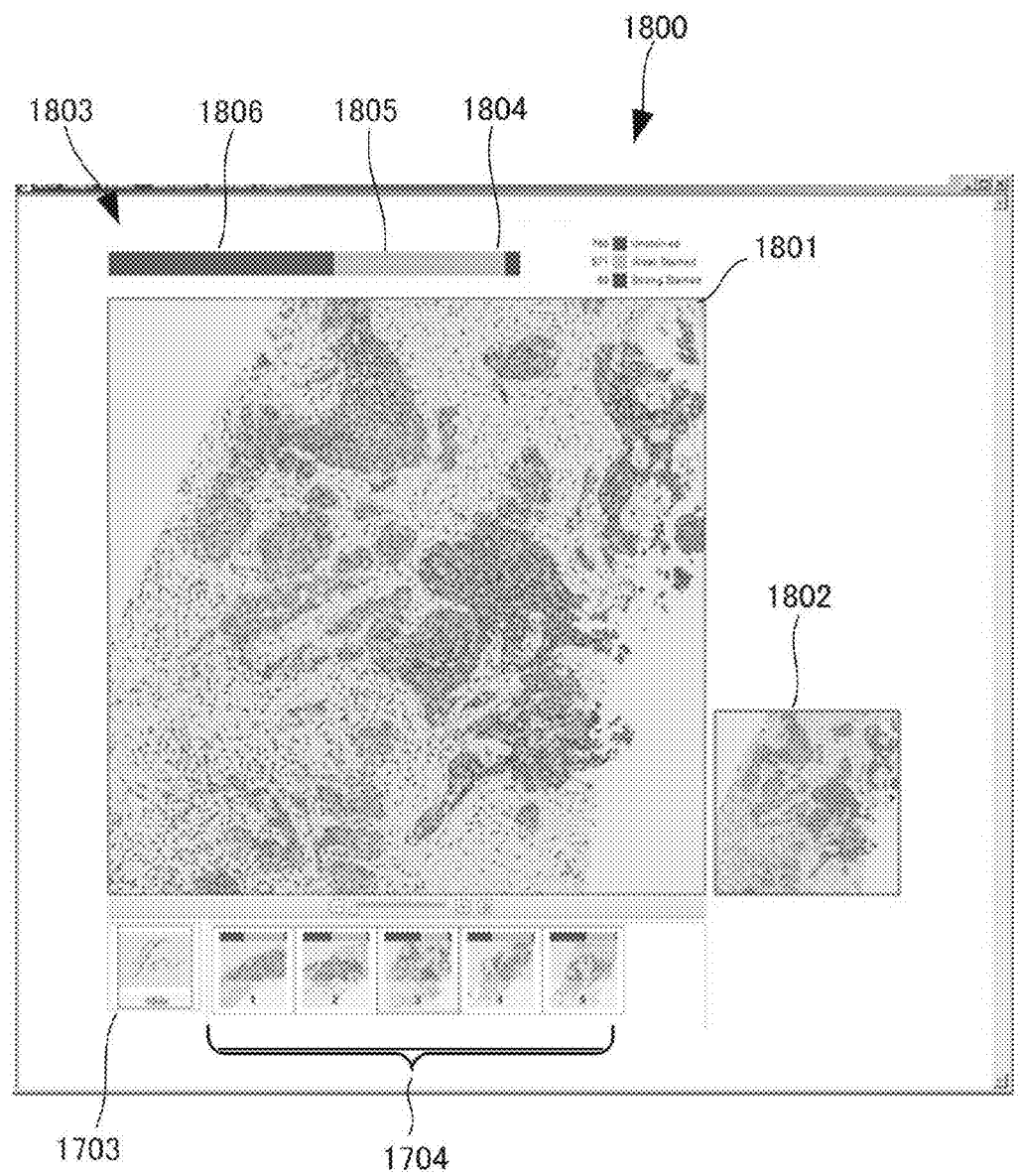
FIG. 18 is a figure showing the second display example of display data generated by processes of the second embodiment.

FIG. 18 is a figure showing a display screen 1800 obtained by displaying the display data generated in the step S1607 on a client PC 220. As shown in FIG. 18, the display screen 1800 includes: an enlarged tissue sample image 1801 of one selected area, a reduced-size image 1802 of the selected area; and a bar-graph 1803 corresponding to the selected area. A thumbnail image 1703 of the entire tissue sample image and thumbnail images 1704 of five selected areas each with a bar-graph are displayed as buttons. FIG. 18 shows an example of a case where the third selected area indicated by the numeral "3" in FIG. 17 is selected, so that a dark-color border of the third selected area indicated by the numeral "3" among the thumbnail images of the five selected areas indicates the result that the third selected area is selected. The bar-graph 1803 corresponding to the third selected area indicated by the numeral "3" is the same as the bar-graph image 1550. The numeral 1804 corresponds to the numeral 1551 of FIG. 15. The numeral 1805 corresponds to the numeral 1552 of FIG. 15. The numeral 1806 corresponds to the numeral 1553 of FIG. 15.

In a step S1609, whether or not the counted number of cells with each staining intensity and the distribution thereof in one selected area is displayed in S515 is determined. When the counted number of cells and the distribution are displayed, in a step S1611, an image obtained by color-coding cells in an enlarged image of the one selected area according to each staining intensity is generated, and an image obtained by adding the counted number of cells with each staining intensity to the image thus obtained is generated as display data.

Figure 19:
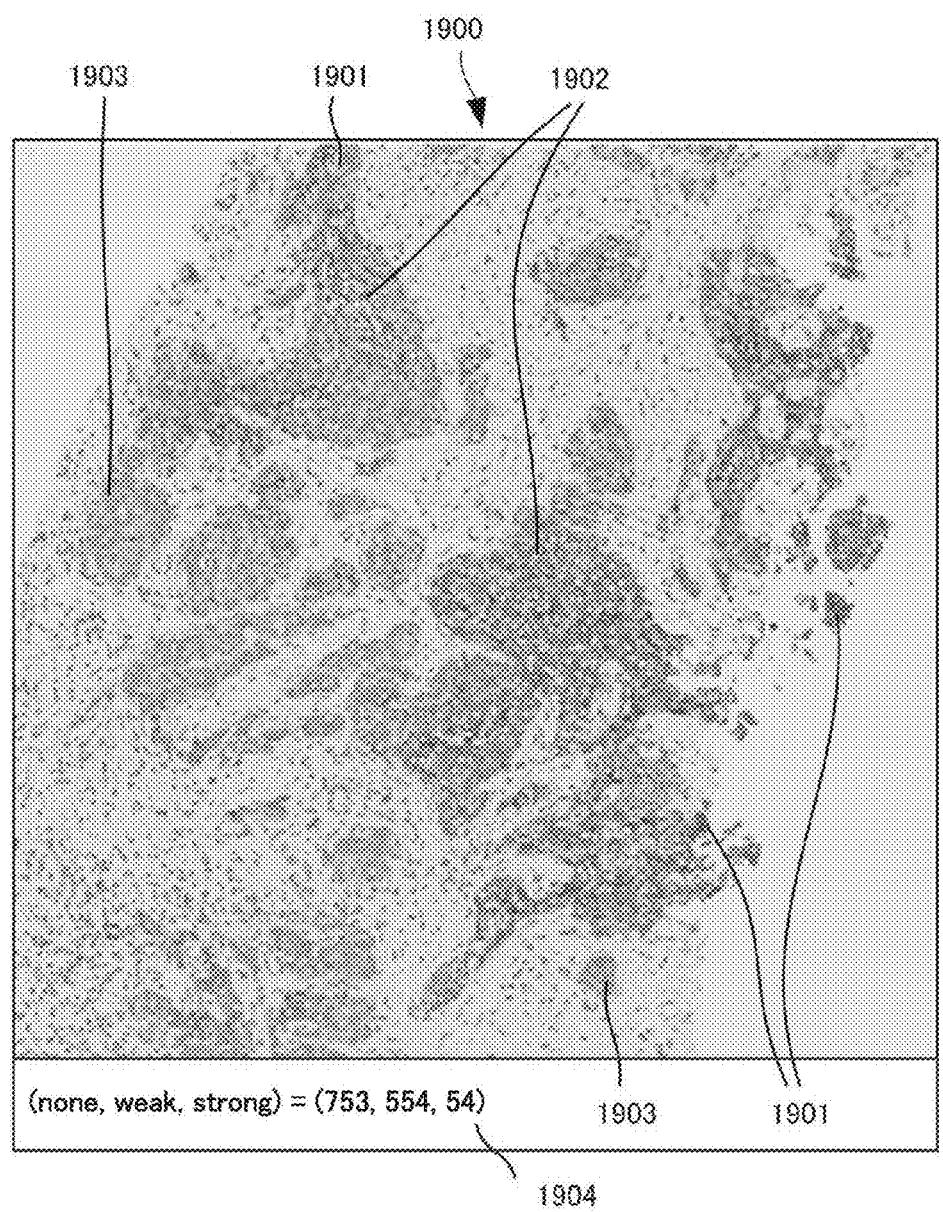
FIG. 19 is a figure showing the third display example of display data generated by processes of the second embodiment.

FIG. 19 is a figure showing a display screen 1900 obtained by displaying the display data generated in the step S1611 on a client PC 220. As shown in FIG. 19, the display screen 1900 includes: an enlarged tissue sample image of one selected area; and the counted number of cells 1904 with each staining intensity. In the enlarged tissue sample image of the one selected area, cells are color-coded with different colors according to each staining intensity. The numeral 1901 indicates cells with staining intensity (strong) colored with red, the numeral 1902 indicates cells with staining intensity (weak) colored with yellow, and the numeral 1903 indicates cells with staining intensity (none) colored with green.

In a step S1613, whether or not a mask-superimposed image obtained by masking the tissue sample image of the selected area with a generated mask is displayed in S515 is determined. When the mask-superimposed image is displayed, a mask-superimposed image (see FIG. 12) is incorporated into display data in a step S1615. An example of a display in the case where the mask-superimposed image is incorporated into display data is not specifically shown. The mask-superimposed image may be displayed as substitute for the tissue sample image of the selected area or may be added to a region of the display screen. The mask-superimposed image can be compared with an image without a mask by displaying the mask-superimposed image, so that whether or not counting of the number of cells with each staining intensity is performed correctly can be checked.

When none of combinations of pieces of display data is selected in the steps S1601, S1605, and S1609, any of the other combinations of pieces of display data and a combination requested from a client PC 220 by a user is provided in a step S1617.

Third Embodiment

The third embodiment of the present invention is described with reference to FIG. 20. In the second embodiment, the pathological image diagnosis support apparatus 200 automatically selects areas, for example, five areas, and the number of cells with each staining intensity is counted. In the third embodiment, as shown in FIG. 20, areas for counting the number of cells with each staining intensity can be selected by a user besides areas automatically selected by the pathological image diagnosis support apparatus 200.

Figure 20:
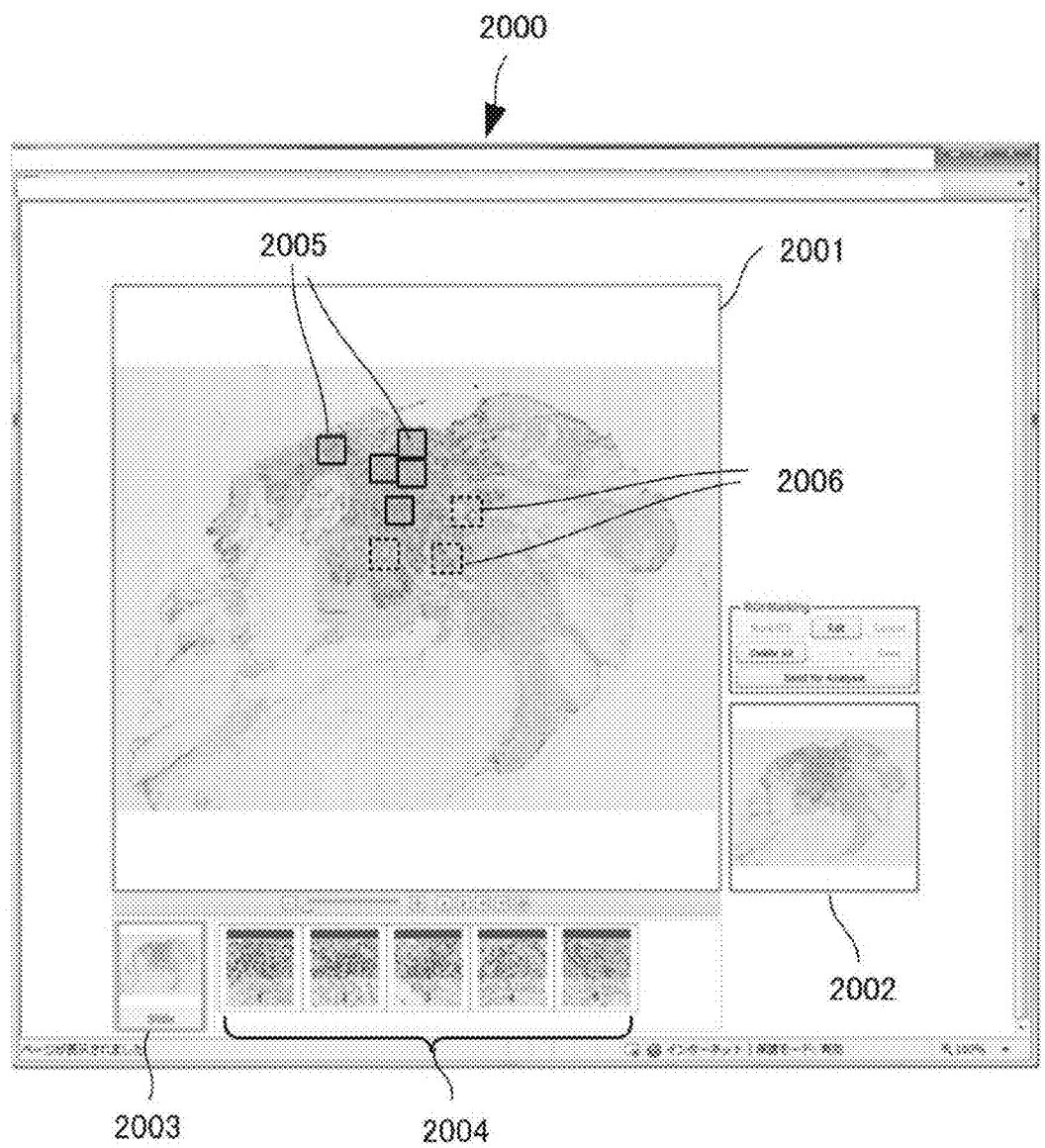
FIG. 20 is a figure showing the fourth display example of display data generated by processes of the third embodiment.

Areas 2005 automatically selected by the pathological image diagnosis support apparatus 200 and areas 2006 selected by a user are displayed on a display screen 2000 of FIG. 20 in the form of being superimposed on the sent tissue sample image 2001. For example, the selected areas can be input from a client PC 220 in response to a display of a screen shown in FIG. 6 on a client PC 220 before counting the number of cells with each staining intensity or in response to a display of a result shown in FIG. 17 after counting the number of cells with each staining intensity.

Other Embodiments

The embodiments of the present invention are described in detail above. The scope of the present invention encompasses any system and apparatus obtained by combining characteristics of the embodiments.

The present invention may be applied to a system composed of a plurality of units or a single unit. The present invention is applicable also in the case where the control program for achieving the functions of the embodiments is supplied from a system or apparatus directly or remotely and executed. Therefore, the scope of the present invention encompasses a control program installed in a computer so as to achieve functions of the present invention, a storage medium storing the control program, and a WWW server from which the control program is downloaded.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

EXPLANATION OF REFERENCE NUMERALS 100 information processing apparatus
110 image processing section (image processing unit)
111 smoothing section (smoothing unit)
115 tissue sample image
120 mask generation section (mask generation unit)
121 binarization section (binarization unit)
125 mask
150 tissue sample image
151 parenchymal cell
152 stromal cell
155 tissue sample image
200 pathological image diagnosis support apparatus (information processing apparatus)
201 communication control section (receiving unit, sending unit)
202 image storage section (image storage unit)
203 area selection section (area selection unit)
204 image processing section (image processing unit)
205 mask generation section (mask generation unit)
206 received tissue sample image
207 mark enclosing selected area
208 tissue sample image of each selected area
209 mask
210 display data generation section (display data generation unit)
220 client PC (input terminal, display terminal)
221 color scanner (input terminal)
230 pathological image diagnosis center (display terminal)
240 network
250 information processing system
301 size-reduction section (size-reduction unit)
302 gray-scaling section (gray-scaling unit)
303 smoothing section (smoothing unit)
304 binarization section (binarization unit)
305 luminance value histogram generation section (luminance value histogram generation unit)
306 threshold value calculation section (threshold value calculation unit)
307 post-processing section (post-processing unit)
308 superimposing section (superimposing unit)
309 counting section (counting unit)
311 bar-graph generation section (bar-graph generation unit)
312 mapping section (mapping unit)
313 display data storage section (display data storage unit)
321 first display data
322 second display data
323 third display data
324 fourth display data
325 fifth display data
410 CPU
420 ROM
430 RAM
431 image data to be processed
432 display data
433 program execution region
440 storage
441 diagnosis support information
442 various parameters
443 various programs
451 tissue sample image received via communication control section 201
452 image of one area selected from received tissue sample image
453 reduced-size image obtained by reducing size of image of selected area so as to fill spaces therein
454 gray-scale image obtained by converting reduced-size image 453 into gray-scale
455 smoothed image obtained by smoothing gray-scale image 454
456 luminance value histogram generated from smoothed image 455
457 binarization threshold value for binarization, calculated based on luminance value histogram 456
458 binary image obtained by binarizing gray-scale image
459 mask image for deleting stromal region, obtained by post-processing binary image such as connection of discrete points, deletion of isolated points, and filling of holes
461 selected area-mapped image obtained by mapping selected area into received tissue sample image
462 the first selected area image of the first selected area
463 the first mask-superimposed image obtained by masking the first selected area image 462 with mask image
464 the first cell count value as the counted number of cancer cells with each staining intensity in mask-superimposed image
465 the first bar-graph image generated based on the counted number of cancer cells with each staining intensity
471 received tissue sample image
472 position and size of selected area as partial region selected from tissue sample image
473 count value relating to cancer cells in selected area
474 processed display data stored so as to be searchable by tissue sample image, patient, case, and the like
481 reduction ratio for use in size-reduction
482 gray-scale parameter for use in changing into gray-scale image
483 smoothing parameter for use in smoothing
484 threshold value calculation parameter for calculating binarization threshold value
485 post-processing parameter for post-processing such as connection of discrete points, deletion of isolated points, and filling of holes
486 staining intensity determination parameter for determining the extent of staining of cell membrane in each cell by IHC staining
491 diagnosis support program for supporting diagnosis
492 area selection program for selecting cancer cell area from tissue sample image
493 image processing program for achieving processes in image processing section 204 (for executing S701 to S709 of FIG. 7)
494 mask generation program for achieving processes in mask generation section 205 (for executing S711 to S719 of FIG. 7)

495 cell count program for counting the number of cells with each staining intensity in image of selected area with mask (for executing S509 of FIG. 5 (specifically see FIG. 13)
496 bar-graph generation program for generating bar-graph showing the proportion of the number of cells from the counted number of cells with each staining intensity (executing S511 of FIG. 5 (specifically see FIG. 14)
497 send data generation program for generating display data for service to client PC 220 via network 240 (for executing S515 of FIG. 5 (specifically see FIG. 16)
600 display screen
601 received tissue sample image
602 reduced-size image of received tissue sample image
603 selected areas for each of which mask is generated
800 third selected area
801 cancer parenchymal cell region observed as dense mass
802 stromal cell region in which dark discrete points are spread
803 background region which is not tissue sample image
910 image obtained after size-reduction and conversion into gray-scale image
920 image obtained by smoothing image 910
1000 luminance value histogram generated based on image 920
1010 peak relating to background region 803 (in color of a preparation in a part which is not tissue)
1020 peak relating to stromal cell region 802
1030 peak relating to cancer parenchymal cell region 801
1040 peak relating to cell nucleus of parenchymal cell
1110 tissue sample image of selected area obtained after binarization
1111 cancer parenchymal cell region having "0" (black) by binarization
1112 stromal cell region having "255" (white) by binarization
1113 discrete point spread from mass of parenchymal cells
1114 isolated point
1115 hole
1120 image obtained after post-processing
1121 region to be mask
1200 tissue sample image of selected area with mask
310 one received tissue sample image
1500 tissue sample image ID
1510, 1520 selected area ID
1511 total counted number of cells
1512 the number of cells with staining intensity (strong) and the proportion thereof
1513 the number of cells with staining intensity (weak) and the proportion thereof
1514 the number of cells with staining intensity (none) and the proportion thereof
1515 bar-graph image pointer
1530, 1540 various pieces of image data
1550 bar-graph image
1551 red bar (the proportion with staining intensity (strong))
1552 yellow bar (the proportion with staining intensity (weak))
1553 green bar (the proportion with staining intensity (none))
1700 display screen obtained by displaying display data generated in step S1603 on client PC 220
1701 tissue sample image with five selected areas superimposed thereon
1702 reduced-size image of tissue sample image
1703 thumbnail image of tissue sample image with color borders of scores
1704 thumbnail images of five selected areas each with bar-graph
1800 display screen obtained by displaying display data generated in step S1607 on client PC 220
1801 tissue sample image
1802 reduced-size image of selected area
1803 bar-graph corresponding to selected area
1804 red bar (the proportion with staining intensity (strong))
1805 yellow bar (the proportion with staining intensity (weak))
1806 green bar (the proportion with staining intensity (none))
1900 display screen when display data generated in step S1611 is displayed on client PC 220
1901 cells with staining intensity (strong) colored with red
1902 cells with staining intensity (weak) colored with yellow
1903 cells with staining intensity (none) colored with green
1904 the counted number of cells with each staining intensity
2000 display screen
2001 sent tissue sample image
2002 reduced-size image of selected area
2003 thumbnail image of tissue sample image with color borders of scores
2004 thumbnail images of five selected areas each with bar-graph
2005 areas automatically selected by pathological image diagnosis support apparatus 200
2006 areas selected by user

What we claim is:

1. An information processing apparatus comprising:
a processor configured to:
smooth a tissue sample image obtained by staining and image a biological tissue containing parenchymal cells and stromal cells so that luminance values of cell components of each of the parenchymal cells become less than those of each of the stromal cells;
generate, through generating a binary image by binarizing the tissue sample image smoothed by the processor, a mask for removing a region of the stromal cells from the tissue sample image;
superimpose the mask generated by the processor on the tissue sample image; and
count a number of the parenchymal cells with each staining intensity contained in the tissue sample image with the mask superimposed thereon,
wherein the information processing apparatus is configured to generate a diagnosis using the tissue sample image.

2. The information processing apparatus according to claim 1, wherein the processor is further configured to generate display data for displaying the number of the parenchymal cells with each staining intensity counted by processor.

3. The information processing apparatus according to claim 2, wherein the processor is further configured to generate display data for displaying the number of the parenchymal cells with each staining intensity counted by the processor in a bar-graph.

4. The information processing apparatus according to claim 3, wherein the processor is further configured to generate display data for displaying a proportion of the number of the parenchymal cells with each staining intensity counted by the processor in a bar-graph.

5. The information processing apparatus according to claim 2, wherein the processor is further configured to generate display data for displaying an image obtained by superimposing the mask generated by the processor on the tissue sample image is generated by the processor.

6. An information processing method, wherein
the information processing apparatus according to claim 2 is used, and
the method comprises:
an image processing operation of smoothing the tissue sample image by the processor so that luminance values of cell components of each of the parenchymal cells become less than those of each of the stromal cells;
a mask generating operation of generating, through generating a binary image by binarizing the tissue sample image smoothed in the image processing operation, a mask for removing a region of the stromal cells from the tissue sample image by the processor;
a superimposing operation of superimposing the mask generated by the processor on the tissue sample image by the processor;
a counting operation of counting the number of the parenchymal cells contained in the tissue sample image with the mask superimposed thereon by the processor;
a display data generating operation of, by the processor, generating display data for displaying the number of the parenchymal cells with each staining intensity counted by the processor; and
generating a diagnosis using the tissue sample image.

7. The information processing apparatus according to claim 1, further comprising:
an input terminal configured to input the tissue sample image into the information processing apparatus; and
a display configured to display the number of the parenchymal cells with each staining intensity counted by the processor or display data generated by the processor.

8. An information processing method, wherein
the information processing apparatus according to claim 7 is used, and
method comprises:
an image processing operation of smoothing the tissue sample image by the processor so that luminance values of cell components of each of the parenchymal cells become less than those of each of the stromal cells;
a mask generating operation of generating, through generating a binary image by binarizing the tissue sample image smoothed in the image processing operation, a mask for removing a region of the stromal cells from the tissue sample image by the processor;
a superimposing operation of superimposing the mask generated by the processor on the tissue sample image by the processor;
a counting operation of counting the number of the parenchymal cells contained in the tissue sample image with the mask superimposed thereon by the processor;
an inputting operation of inputting the tissue sample image into the information processing apparatus by the input terminal;
a display operation of displaying, by the display, the number of the parenchymal cells with each staining intensity counted by the processor or the display data generated by the processor; and
generating a diagnosis using the tissue sample image.

9. The information processing apparatus according to claim 2,
wherein the information processing apparatus is configured to receive the tissue sample image via a network and is configured to send the number of the parenchymal cells counted by the processor or the display data generated by the processor via a network.

10. An information processing system comprising:
the information processing apparatus according to claim 9;
an input terminal; and
a display terminal, wherein
the input terminal is configured to input and send, via a network, the tissue sample image received by the information processing apparatus, and
wherein the display terminal is configured to receive, via the network, and display the number of the parenchymal cells counted by the processor or the display data generated by the processor.

11. An information processing method, wherein
the information processing apparatus according to claim 9 is used, and
the method comprises:
an image processing operation of smoothing the tissue sample image by the processor so that luminance values of cell components of each of the parenchymal cells become less than those of each of the stromal cells;
a mask generating operation of generating, through generating a binary image by binarizing the tissue sample image smoothed in the image processing operation, a mask for removing a region of the stromal cells from the tissue sample image by the processor;
a superimposing operation of superimposing the mask generated by the processor on the tissue sample image by the processor;
a counting operation of counting the number of the parenchymal cells contained in the tissue sample image with the mask superimposed thereon by the processor;
a receiving operation of receiving the tissue sample image by the information processing apparatus via a network;
a sending operation of sending, by the information processing apparatus via a network, the number of the parenchymal cells counted by the processor or the display data generated by the processor; and
generating a diagnosis using the tissue sample image.

12. An information processing method, wherein
an information processing system is used, and
the information processing system comprising:
the information processing apparatus according to claim 9;
an input terminal; and
a display terminal, wherein
the tissue sample image received by the information processing apparatus is input and sent, via a network, by the input terminal, and
the number of the parenchymal cells counted by the processor or the display data generated by the processor is received, via a network, and displayed by the display terminal,
and the method comprises:
an image processing operation of smoothing the tissue sample image by the processor so that luminance values of cell components of each of the parenchymal cells become less than those of each of the stromal cells;
a mask generating operation of generating, through generating a binary image by binarizing the tissue sample image smoothed in the image processing operation, a mask for removing a region of the stromal cells from the tissue sample image by the processor;

a superimposing operation of superimposing the mask generated by the processor on the tissue sample image by the processor;

a counting operation of counting the number of the parenchymal cells contained in the tissue sample image with the mask superimposed thereon by the processor;

a receiving operation of receiving the tissue sample image by the information processing apparatus via a network;

a sending operation of sending, by the information processing apparatus via a network, the number of the parenchymal cells counted by the processor or the display data generated by the processor;

an inputting and sending operation of, by the input terminal, inputting and sending, via a network, the tissue sample image received by the information processing apparatus;

a receiving and displaying operation of, by the display terminal, receiving, via a network, and displaying the number of the parenchymal cells counted by the processor or the display data generated by the processor; and generating a diagnosis using the tissue sample image.

13. An information processing method, wherein the information processing apparatus according to claim 1 is used, and the method comprises:

an image processing operation of smoothing the tissue sample image by processor so that luminance values of cell components of each of the parenchymal cells become less than those of each of the stromal cells;

a mask generating operation of generating, through generating a binary image by binarizing the tissue sample image smoothed in the image processing operation, a mask for removing a region of the stromal cells from the tissue sample image with the processor;

a superimposing operation of superimposing the mask generated by the processor on the tissue sample image by the processor; and a counting operation of counting the number of the parenchymal cells contained in the tissue sample image with the mask superimposed thereon by the processor, wherein the information processing apparatus is configured to generate a diagnosis using the tissue sample image.

* * * * *